Jan. 26, 1971 D. H. BINGHAM, JR 3,559,021
METHOD AND APPARATUS FOR TRACING PATTERNS TO DEVELOPE MULTIAXES
NUMERICAL PROGRAMS FOR SERVO CONTROLLED MACHINE TOOLS
Filed Feb. 9, 1967 5 Sheets-Sheet 1

INVENTOR.
DARWIN H. BINGHAM, JR.
BY
Wolfe, Hubbard, Voit & Osann
ATTORNEYS.

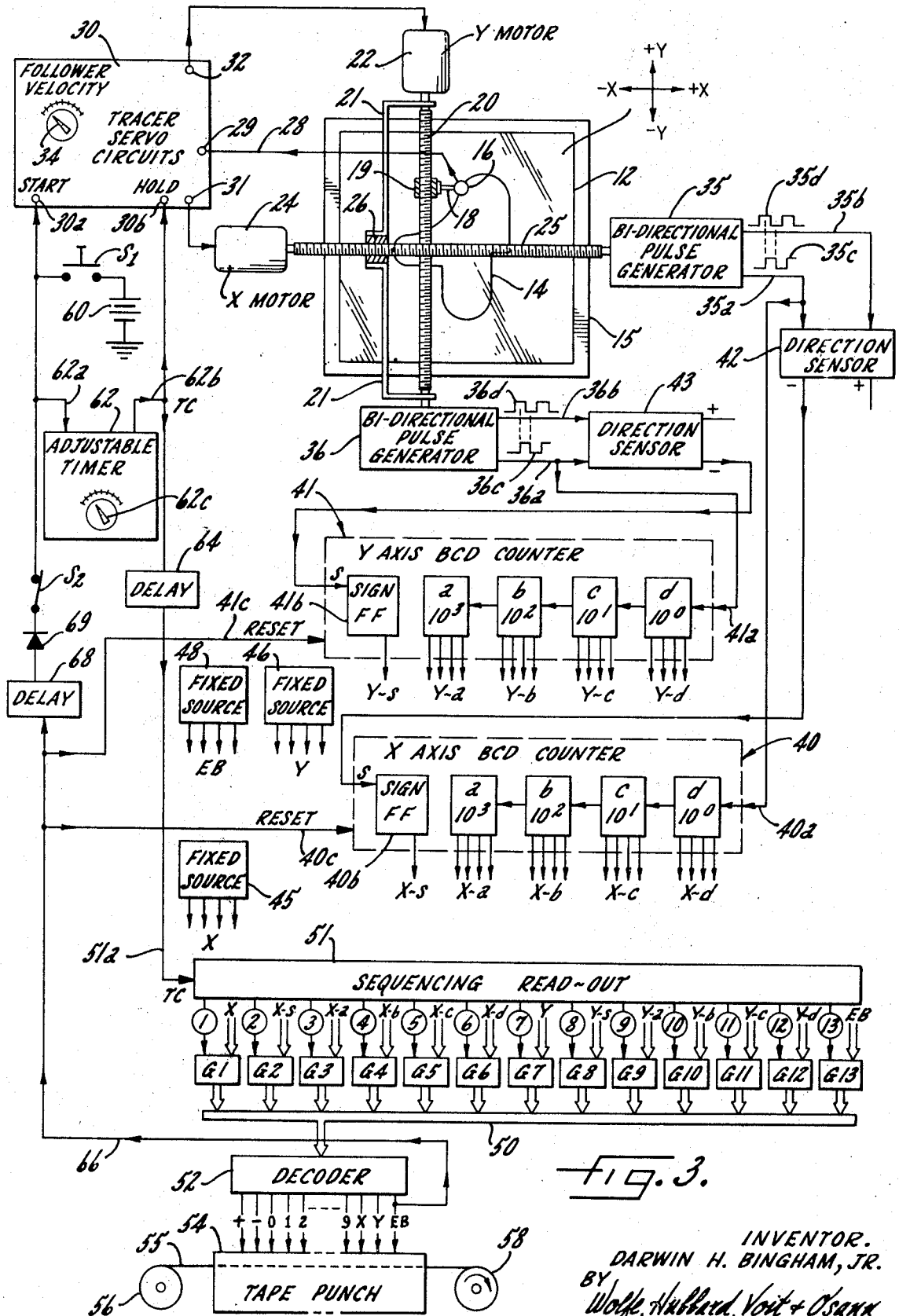

INVENTOR.
DARWIN H. BINGHAM, JR.
BY
Wolfe, Hubbard, Voit & Osann
ATTORNEYS.

INVENTOR.
DARWIN H. BINGHAM, JR.
BY
Wolfe, Hubbard, Voit & Osann
ATTORNEYS.

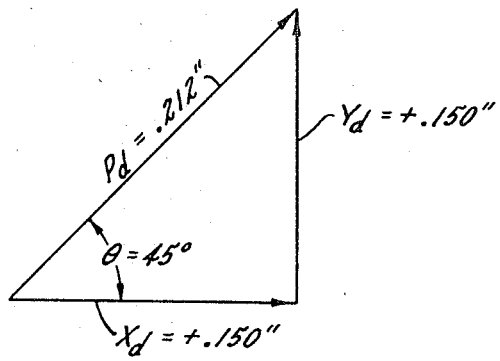
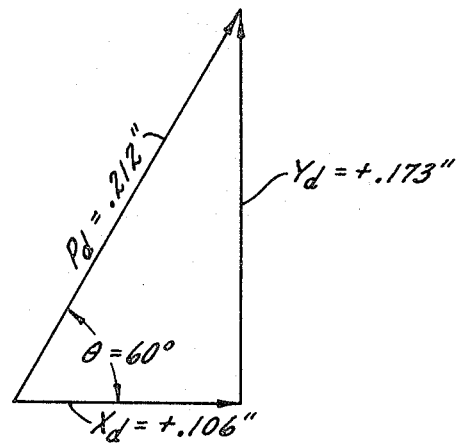
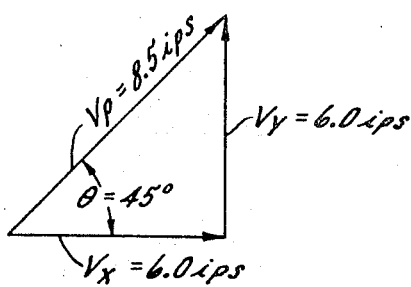
BLOCK n
Fig. 8a.
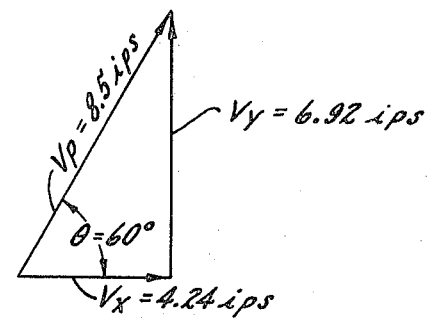
BLOCK (n+1)
Fig. 8b.
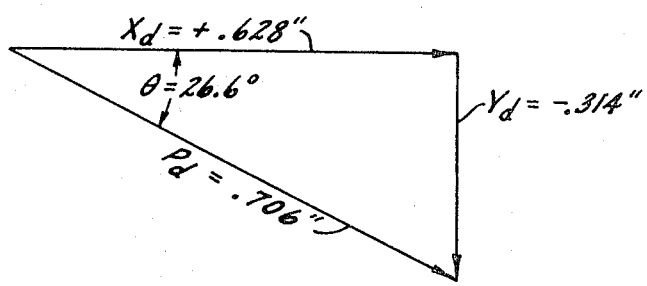
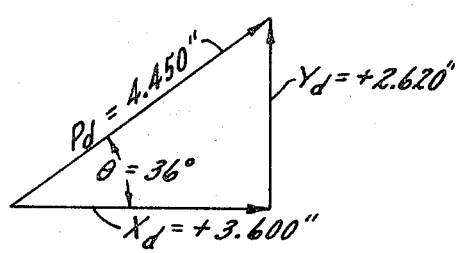
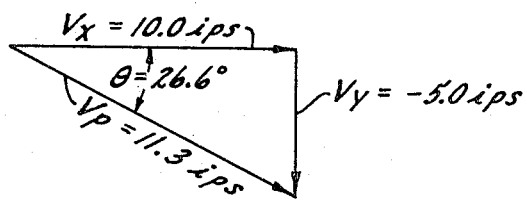
BLOCK (n+10)
Fig. 8c.
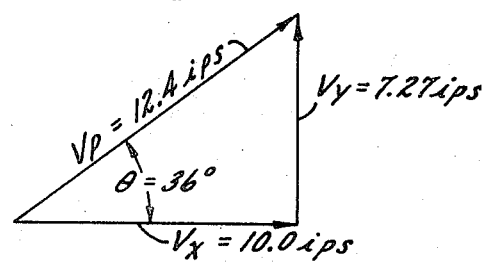
BLOCK (n+11)
Fig. 8d.

United States Patent Office 3,559,021
Patented Jan. 26, 1971

3,559,021
METHOD AND APPARATUS FOR TRACING PATTERNS TO DEVELOP MULTIAXES NUMERICAL PROGRAMS FOR SERVO CONTROLLED MACHINE TOOLS
Darwin H. Bingham, Jr., Rockford, Ill., assignor to Ekstrom, Carlson & Co., Rockford, Ill., a corporation of Illinois
Filed Feb. 9, 1967, Ser. No. 614,943
Int. Cl. G05b 19/42, 19/24
U.S. Cl. 318—568                                16 Claims

ABSTRACT OF THE DISCLOSURE

The motions of a movable element, such as the cutter of a machine tool, along a desired arbitrary and contoured path are produced by tracing a facsimile or line drawing of the path with an instrument and measuring the latter's displacements along orthogonal axes to create successive blocks of numerical information each designating commanded displacements of the element along X and Y axes. The successive blocks of numerical data are then used in a process of simultaneous linear interpolation along X and Y axes to cause the movable element to execute the desired path. The blocks of data contain no feed rate or velocity-designating information. But the feed rate of the element along the path is controlled by (a) causing the X and Y displacements for successive blocks of information during the tracing step to correspond to selectable but equal composite distance increments $\Delta D$ along the facsimile line, and (b) causing the X and Y commands in a block of data to be executed during equal successive time intervals. The velocity of the element along the path is thus always proportional to the composite tracing increment $\Delta D$ and is controlled by selecting different values for that incrment. In those situations when the chosen increment $\Delta D$ would result in attempts to drive the movable element along X or Y axis at a velocity greater than the obtainable, the time intervals for execution of a block of data are lengthened so that motions of the element take place with the maximum velocity along one of the axes.

---

The present invention relates in general to what has become known as the art of "numerical control," and in particular to a method of moving an element along two or more orthogonal axes so that such element executes any desired linear or curved path in successive linear interpolation steps. Although the invention will find especially advantageous use in the numerical control of machine tools to cut desired contours on workpieces, and will be herein described in that environment, the invention may be employed with equal advantage in controlling the motions of other devices such as metal cutting torches, map plotters, cloth pattern cutters, and the like.

It has been the general practice in the art of numerically controlling contouring machine tools to have a programming technician abstract purely numerical information from a drawing or mathematical definition of the desired workpiece. That numerical information is either directly, or after modification in a general purpose computer, placed in the successive "block" of a punched tape or the like which are then read successively into an interpolating "director." Each block of data includes displacement commands along two or more orthogonal coordinates, say X and Y axes, and the director converts these commands into simultaneous motions of the movable element, or cutter, along X and Y axes relative to the workpiece. In this procedure, a velocity or feed rate of the cutter is decided upon by the programming technician and is represented by velocity commands (and known as "feed rate numbers" or "time cycle" designations) on the punched tape. The "director" includes special circuitry and control portions which respond to such velocity commands so as to produce at least approximately the desired velocity of the cutter as it executes each block of commanded displacements.

In many applications it is difficult to determine the X and Y axis displacements which must be executed during successive steps or blocks in order to cut abstract, mathematically indefinable, subtle contours. Sharp, arbitrary curvatures require a multitude of successive short steps or data blocks for reasonably precise execution, and thus require the programmer to compile a mass of numerical data. These considerations are especially applicable where "free form" and dimensionally undefined shapes drawn by an artist are to be reproduced in a finished metal or wood workpiece.

As a variation of the common practice of mentally determining X and Y axis displacement commands it has been an alternative procedure to trace a facsimile or drawing of the desired contoured path with a line or pattern follower. As the follower moves through successive equal X axis (or Y axis) increments, its displacements along the Y axis (or X axis) are measured. The increments and corresponding displacements form the X and Y axis numbers for successive blocks of data. In this procedure, however, there is no control over the velocity at which the element is subsequently moved along the desired path, and such velocity may vary over a wide range depending upon the angle of the path increment created by the relative magnitudes of the X and Y axis displacements.

The composite velocity of the movable element, i.e., the vector resultant of its component velocities along X and Y axes, may be a critical factor in many types of contouring operations. For example, if the movable element is a rotating milling cutter translatable along X and Y axes to cut a desired two-dimensional contour on a workpiece, the path velocity is desirably kept as high as possible for fast and efficient production. But if the velocity becomes excessive for a given type of cutter, then either the cutter or the workpiece may be overheated and damaged. Moreover, unless the path velocity of the cutter is kept constant, the milled surface finish on the workpiece may have objectionable irregularities. Thus, it is highly important to be able to select and maintain a desired composite path velocity of the movable cutter.

It is the general aim of the present invention to provide a new, simple, and advantageous method for moving an element through any desired contour path while nevertheless controlling its velocity along the path.

Another object is to provide such a method wherein numerical command data is derived in the first instance by tracing a facsimile or drawing of the desired final contour, the feed rate or path velocity of the movable element being conveniently determined by simple settings or adjustments made during the tracing operation. While the tracing step may be performed manually, it may also be performed by automatic tracing equipment associated with data accumulating devices, and in the latter case the ultimate feed rate of the movable element to be controlled is determinable simply by setting a calibrated adjustment knob.

Still another object of the invention is to provide a method of moving an element along any desired contour path and at a uniform but selectable path velocity, yet wherein the contouring motions are produced in a very much simplified procedure of linear interpolation by virtue of the fact that successive path increments or data blocks are executed in successive equal increments of time. Indeed, in those cases where the final step of controlling the movable element in its motions along two or more axes is carried out by a numerical control "director," the latter can be drastically reduced in its number of parts, in its complexity, and in its cost—as compared with conventional and well known directors.

It is an additional objective of the invention to provide a method of contouring wherein path velocities of the movable element are determined conveniently during a step of tracing a facsimile of the desired contour, and yet which results in the velocity of the movable element along any axis simply leveling off at the maximum permissible value in the event that the technician purposely or inadvertently makes an adjustment during tracing which tends to require an axis velocity higher than the maximum at which the element can be moved.

A further object of the invention is to provide a convenient method of making a digital record containing successive blocks of multi-axis displacement commands, the record containing no velocity-representing information, but being usable to produce contouring motion of an element with composite velocities determined at the time of, and as an incident to, making the record.

These and other objects of the invention will become apparent as the following description proceeds, taken in conjunction with the accompanying drawings, in which:

FIG. 3 is a diagrammatic block-and-line illustration of an exemplary tracing and record making apparatus which may be used in performing certain steps of the novel method to be described;

FIGS. 8a–d are vector diagrams of displacements and velocities which will result from execution of the four typical blocks of command data shown on the record in FIG. 5.

While the invention will be described in some detail with reference to a particular and examplary application of the novel method, and with reference to particular embodiments of apparatus for performing certain steps, there is no intention to limit the invention to such details. On the contrary, it is intended here to cover all alternative and equivalent procedures, and either the use of other types of apparatus or manual execution for the various steps, which fall within the spirit and scope of the invention as defined by the appended claims.

Figure 1:
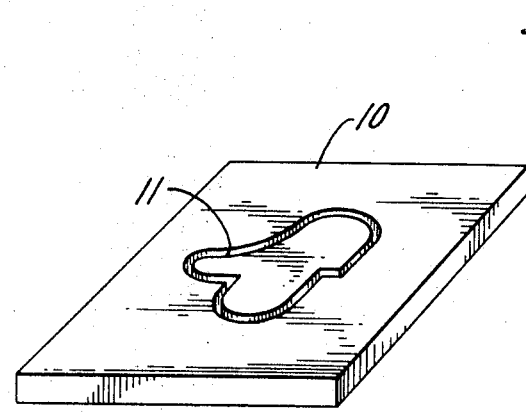
FIG. 1 illustrates a workpiece to be formed with a groove of complex shape by moving a milling cutter through a path corresponding to the shape of the groove.

For purposes of specific description but without in any way limiting the application of the method to be described, FIG. 1 shows an exemplary workpiece 10, here a thick metal plate, which in its finished form is to have a groove 11 of arbitrary shape cut therein. The width of the groove in this example will be equal to the diameter of a rotating cutter plunged into the workpiece to a desired depth and then moved around a predetermined desired path to cut the groove 11 in the illustrated shape. The path through which the milling cutter must travel is one which includes linear sections, sections of sharp curvatures, and sections of shallow or gradual curvatures, and it will be understood that the path may have any desired shape or contour whether or not the successive sections thereof are mathematically definable or indefinable. Of course, rather than a contoured groove 11 as here illustrated, the desired finished form of the workpiece may be an arbitrary contoured external surface created by moving a milling cutter or the like through a predetermined desired path.

Figure 2:
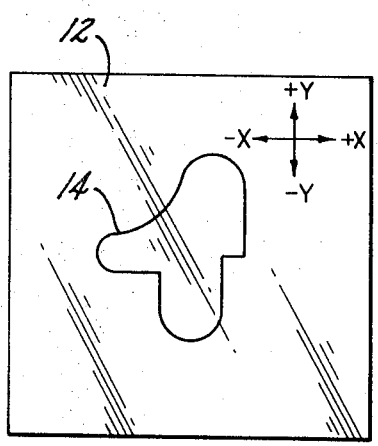
FIG. 2 is a plan view of a scale line drawing or facsimile of the path through which the cutter must move relative to the workpiece of FIG. 1 in order to cut the desired groove.

To begin the process which is to culminate in the finished workpiece 10 with the groove 11 therein, a facsimile of the desired path through which the cutter must move, relative to the workpiece, is first prepared. As a specific example, that facsimile may be a simple drawing 12 (FIG. 2) with a pencilled or inked line 14 corresponding to the shape of the center line of the groove 11 and thus to the path through which a milling cutter is to be moved. The drawing 12 may be made freehand by an artist, and this procedure will be followed, for example, where "free form" scrolls or curved patterns of aesthetically pleasing shapes are to be cut in wood panels. Alternatively, the drawing 12 may be made in the conventional manner of mechanical engineering drawings, based upon previously defined dimensions and shapes. It is not essential that the line 14 on the drawing 12 represent the actual size of the desired path, but only that it be a scaled representation corresponding to the shape of the desired path. The term "scale facsimile" will be used herein to designate a model or line representation of a desired motion path, and irrespective of whether the size of the line representation has a ratio greater than, equal to, or less than a 1:1 with respect to the actual size of the desired path.

With the drawing or facsimile made in the first instance to define the desired path, or with the drawing made to represent a previously conceived desired path, the method of the present invention next involves tracing the facsimile with an instrument to make the latter follow the scale facsimile of the desired path. The tracing instrument may be moved manually or by an automatic curve follower, the latter being diagrammatically illustrated in FIG. 3. As there shown, the drawing 12 is placed on the table 15 of a servo-controlled, photoelectric line tracer which may, for example, be of the well known type manufactured by the Andrew Engineering Company of Minneapolis, Minn., and which thus need only be described briefly.

In essence, this apparatus includes as a tracing instrument a head 16 carrying one or more photoelectric cells and supported silghtly above the drawing 12 by a carriage 18 extending from a nut 19 engaged with a lead screw 20 journaled at its opposite ends in a frame 21. As the lead screw 20 is rotated in one direction or the other by a servomotor 22 mounted on the frame, the photoelectric head 16 will be moved in a positive or negative direction along what is here designated the Y axis of the tracing table. The frame 21 is movable (along supporting ways, not shown) to the right or to the left, here designated positive or negative directions along an X axis, in response to a servomotor 24 turning a lead screw 25 in one direction or the other, the lead screw being engaged by a nut 26 fixed to the frame 21.

Assuming that the curve follower has been placed in operation and that the head 16 is moving along the line 14, the photoelectric cells within that head will produce error signals if and when the head tends to depart from exact registry with the line 14. Such signals are supplied via conductors 28 to the input terminal 29 of servo control circuits 30. These circuits amplify any error signals from the photoelectric head 16 and convert them into correction signals of the proper polarity and magnitude on output terminals 31 and 32. The correction signals on the terminals 31 and 32 are applied to the X and Y axis servomotors 24 and 22, causing the latter to turn by amounts and in the proper directions to keep the photoelectric head 16 moving along and registered with the facsimile line 14. In other words, the sense and extents of the simultaneous displacements of the head 16 along the X and Y axes are produced by the servomotors 24 and 22 in a manner such that the vector combination of the X and Y axis motions results in the head 16 precisely following the line 14. The velocity with which the head 16 moves along the line 14, i.e., the composite velocity which results from the sum of the individual X and Y axis velocities, may be adjusted and controlled with the tracing system here described. For this purpose it is only necessary for an operating technician to adjust a velocity-determining control knob 34 relative to a calibrated scale in order to select or change the composite velocity (for example, in inches per second) with which the head 16 moves along the path defined by the line 14.

In keeping with the present invention, the displacements $\Delta X$ and $\Delta Y$ of the tracing instrument or head 16 along the orthogonal X and Y axes, which result from the instrument moving through successive composite incremental distances $\Delta D$, are measured. This may, of course, be accomplished by manually measuring the X and Y displacements of the head 16 after it has been manually moved through each successive increment along the line 14, but in the preferred procedure it is carried out automatically. As illustrated in FIG. 3, bi-directional pulse generators 35 and 36 are respectively coupled to and driven by the lead screws 25 and 20, and such generators serve, in effect, to produce one voltage for each basic unit of distance traveled by the head 16 along the X and Y axes, respectively.

The bi-directional pulse generators are per se well known in the art, and it will suffice simply to note here that the X axis pulse generator 35 has two output lines 35a, 35b on which appear squarewave voltages 35c, 35d, there being one cycle in each such squarewave for each increment of rotation of the generator input shaft. If the lead screw 25 and the input shaft of the generator 35 are turned in that direction which moves the head 16 in a +X direction, then the wave 35c will lead the wave 35d by a 90° phase angle; but if the lead screw 25 and input shaft turn in the opposite direction so that the head 16 is moved in a —X direction, the waveform 35c will lag the waveform 35d by a 90° phase angle. Merely to have a concrete example, it will be assumed here that there is one cycle or "pulse" in each of the waveforms 35c, 35d for each .001" of movement by the head 16 along the X axis but it will be understood that basic units of distance other than .001" may be adopted by appropriately choosing the pitch of the lead screw and the drive ratio of its connection to the lead screw of the generator 35. Pursuant to that example, it will be apparent that if the head 16 moves a distance of .564" along the X axis, then 564 cycles or "pulses" will appear in the waveform 35c.

The pulse generator 36 for the Y axis functions in exactly the same way, producing on its output lines 36a, 36b waveforms 36c, and 36d, the phase relation of the latter representing the direction of movement by the head 16 along the Y axis, and the number of cycles or "pulses" in the waveform 36c corresponding to the extent of the displacement of the head 16 along the Y axis.

To complete the measurements of displacements along the X and Y axes, the number of basic units signalled by the pulse generators 35 and 36 are accumulated and signaled in numerical notation. For this purpose, the output waves or pulses 35c and 36c are counted in X and Y axis counters 40 and 41. Each of these counters includes four decade stages labeled $10_0$, $10_1$, $10_2$ and $10_3$ connected in tandem. Each such decade counter state may, in well known fashion, contain four bistate devices or flip-flops interconnected to as to scale by a factor of ten and to represent in binary coded decimal notation on its four output lines the value of the number of pulses which it has received. The input lines 40a and 41a for the two counters are connected respectively to the generator output lines 35a and 36a, so that the counters 40 and 41 register one count for each full wave or pulse in the waveforms 35c and 36c, respectively. Thus, as the tracing head 16 is displaced through each successive basic unit distance of .001" along the X and Y axes, the count registered in counters 40 and 41 will be increased by one unit.

Assuming that the counter 40 is initially in its reset or 0.000 state, if the head 16 moves a total of 387 units or .387" along the X axis, then the counter 40 will receive 387 pulses, the first decade producing thirty-eight carry pulses and ending in its "7" state so that the decimal integer "7" will be signalled in BCD notation on its four output lines X–d. Similarly, the second decade stage in the counter 40 will receive 38 input pulses so that it produces three carry pulses and ends up in its "8" state so that the decimal integer "8" will be signalled in BCD notation on its four output lines X–c. The third decade stage labeled $10^2$ will receive three input pulses, so that it will reside in its "3" state, and the decimal integer "3" will be signalled in BCD notation on its four output lines X–b. Thus, in response to the receipt of 387 input pulses, the counter 40 will store and represent the number 0.387.

The Y axis counter 41 responds in the same manner to pulses received from the generator 36. Its count will be increased by one each time the head moves 0.001" along the Y axis, and thus the counter 41 will signal the total displacement along the Y axis by the number which is represented on its four groups of output lines Y–a, Y–b, Y–c and Y–d.

To signal the signs of the X and Y axis displacements which are registered in the counters 40 and 41, sign flip-flops 40b and 41b are associated with those counters. Phase-responsive direction sensors 42 and 43 are coupled to receive the two waveforms from the respective pulse generators 35 and 36, and produce a voltage signal on their + or — output lines when the movement of the head 16 along the X and Y axes is positive or negative. The sign flip-flops 40b and 41b are normally in the reset state, and the binary signal at their output terminals X–s and Y–s are normally representative of positive signs. However, these flip-flops 40b and 41b are connected to the — output lines of the direction sensors 42 and 43 so as to be switched to a set state whenever the head 16 moves in a negative direction along the X or Y axis, respectively. When in the set state, the flip-flops 40b and 41b represent, by the signal on their output terminals X–s and Y–s, a negative sign for the X or Y axis displacement which is registered in and signalled by the counters 40 or 41.

As the head 16 is moved along the line 14, the basic units of its displacements along the X and Y axes will be counted and registered in the counters 40 and 41, respectively. Moreover, the signs of the X and Y displacements will be signalled by the flip-flops 40b and 41b, respectively, these flip-flops being switched to their set states only if their corresponding displacements are negative. Thus, the displacement $\Delta X$ of the head 16 will be represented in and signalled by the counter 40 as a signed four digit decimal number $\pm a.bcd$, where each of the letters may be any decimal integer from 0 to 9. Similarly the displacement $\Delta Y$ of the head 16 will be registered in and signalled by the counter 41 as a signed four digit decimal number $\pm a.bcd$. Each integer of the X and Y displacement numbers will be signalled in BCD notation on the four output lines of the appropriate decade counter stage, and the sign of the $\Delta X$ and $\Delta Y$ displacement numbers will be represented by a binary "0" or binary "1" voltage level on the output lines X–s and Y–s of the two sign flip-flops.

After a given set of ΔX and ΔY numbers have been registered, and the flow of input pulses to the counters 40 and 41 has been interrupted (in a manner to be explained below), such axis displacement numbers are recorded on a physical digital record, for example, a punched paper tape. For this purpose, thirteen four-bit gates here labeled G1 through G13 are sequentially enabled and each gate serves to pass signals which represent one character or decimal integer. More particularly, it will be seen from FIG. 3 that the gate G1 receives as one set of inputs from a fixed source 45 of binary coded signals which are representative of the character "X." The gate G2 has as one input the output line X–s of the X sign flip-flop 40b. The gates G3 through G6 respectively receive as one input the binary coded decimal output signals X–a, X–b, X–c and X–d from the counter 40. The seventh gate G7 receives as one input from a fixed source 46 a binary coded representation of the character "Y"; the gate G8 receives as one input the signal Y–s from the sign flip-flop 41b; and the gates G9 through G12 receive as one input the output lines Y–a, Y–b, Y–c and Y–d, respectively, from the counter 41. The last gate G13 receives as one input from a fixed source 48 a binary coded representation of the character EB, this being the designation for "end of block."

In order to enable the gates G1–G13 sequentially so that their first inputs are successively routed onto a common output trunk 50, a sequencing readout device 51 is provided with thirteen output terminals respectively connected to the thirteen gates. When an enabling signal is applied to the input terminal 51a of the readout device, the latter functions to place its terminals 1 through 13 sequentially at a binary "1" level so as to sequentially open the gates G1 through G13. The specific organization and operation of the readout device 51 may take any one of a variety of forms well known to those skilled in the art. For example, the sequencing device 51 may take the form of a tapped delay line, or it may be constructed as a plurality of thirteen one shot multi-vibrators connected in tandem with each being connected to trigger the next when it resets.

In any event, whenever an enabling signal is momentarily applied to the terminal 51a, the readout device 51 will sequentially open the gates G1 through G13, so that the characters or numerals signalled at the other inputs of these gates will sequentially appear on the common trunk 50.

To complete the digital record, the trunk 50 is connected to the input of a decoder 52 here shown as having fifteen output terminals labeled +, –, 0–9, X, Y and EB. Whenever a group of signals on the trunk 50 represents in binary decimal notation any one of these numerals or characters, the corresponding output line of the decoder 52 will receive a signal voltage, and these output lines are connected to the inputs of a tape punch 54 which is here shown only diagrammatically, since its organization and operation are well known to those skilled in the art. Stated briefly, the tape punch 54 functions to punch holes in a predetermined combination of a plurality of positions in one traverse row of a paper tape 55 in response to an input signal received on one of its input lines. After and as a consequence of each punching operation, the tape 55 is stepped in a lengthwise direction by a distance corresponding to one row, the tape being fed in sequential steps from a supply reel 56 through the punch itself and onto a take-up reel 58. It will here be assumed, merely by way of example, that the tape punch 54 is similar in its organization to that presently being sold in the United States under the trademark Flex-O-Writer, and that the different characters or numerals will be represented in successive rows of holes formed in the punched tape according to the well known "Flex-O-Writer" code. The nature of the finished punched tape will be described below in more detail with reference to FIG. 5.

As an important feature of the present invention, successive sets of measured ΔX and ΔY displacements are recorded each time that the tracing instrument moves through one of a plurality of successive equal, but selectable, composite distance increments ΔD along the path defined by the facsimile or line 14. In those instances where the tracing instrument is manually transported to follow the line 14, the motion can be terminated each time the selected composite increment ΔD has been traveled, and the corresponding displacements ΔX and ΔY may then be measured and recorded on a physical digital record. However, the apparatus shown in FIG. 3 enables the tracing operation to be carried out with successively equal, but selectable composite distances ΔD automatically without any laborious, time-consuming manual operations on the part of a technician.

Let it be assumed that the drawing 12 (FIG. 3) has been placed on the tracing table 15 and that the head 16 has been adjusted by visual alignment to a desired starting point on the line 14. Further, it will be assumed that the counters 40 and 41 are both reset, and that they thus initially store numbers which are zero.

If now an operating technician momentarily closes a start switch S1 (FIG. 3), an enabling signal will be applied from a source or battery 60 to the "start" terminal 30a of the tracer servo circuits 30, and the automatic tracing apparatus will begin operation. Simultaneously, however, closure of the switch S1 supplies an enabling signal to the input line 62a of an adjustable timer 62 which is, in well known fashion, arranged to produce a signal TC at its "time complete" output terminal 62b after a predetermined time period t has lapsed. The timing cycle or duration of the time period t may be selected and adjusted by setting a control knob 62c with reference to a calibrated scale. Thus, after momentary closure of the start switch S1 the tracing head 16 will begin moving along the line 14 at a velocity determined by the setting of the knob 34, and the timer 62 will begin one cycle of its timing operation.

As the head 16 moves progressively along the line 14 and automatically follows the latter, a pulse will be produced by the generators 35 and 36 for each .001″ of motion along the X and Y axes, respectively. Such pulses will be received by and registered in the counters 40 and 41 so that the numbers held in the latter represent the accumulated displacements of the head 16 along the X and Y axes. If the motion of the head along the X or Y axis is in a negative direction, the sign flip-flop 40b or 41b will be set by a signal received from the direction sensor 41 or 43, as previously explained.

When the timer 62 times out, the "time complete" signal TC which appears on the output terminal 62b is applied to the "hold" terminal 30b of the tracer servo circuits 30, thereby causing the latter to terminate motion of the head 16 and to hold it stationary. That same signal TC also passes through a device 64 which produces a short time delay and then appears on the enabling line 51a of the sequencing readout device 51. The latter thus sequentially opens the gates G1 through G13 so that the output terminals of the decoder 52 sequentially receive signals representing the signed ΔX and ΔY displacement numbers stored in the counters 40 and 41. In this way, the sign and successively lower order digits of the number held in the counter 40 are read out seriatim and recorded in sequence on the punched tape; the sign and successively lower order digits of the number stored in the counter 41 are read out seriatim and recorded in a continuing sequence on the punched tape; and an "end of block" symbol is then recorded on the tape as the last symbol in the sequence. More specifically, the output terminals of the decoder 52 will receive signals sequentially representing the thirteen characters $X \pm abcdY \pm abcdEB$, where the lower case letters $a, b, c, d$ may be any decimal integer 0 through 9. The particular signed ΔX and ΔY numbers will thus be recorded after their respective address letters X and Y in twelve successive rows of holes punched in the tape 55, and a thirteenth row in the tape will represent the "end of block" symbol EB.

When the EB terminal of the decoder 52 receives the last of the thirteen sequential readout signals, that signal is applied also via a line 66 to reset terminals 40c and 41c for the counters 40 and 41. As a result, all of the decade stages in both counters will be reset to their "0" states, and the sign flip-flops 40b, 41b will be switched to or left in their reset states so as to signal positive signs. This same signal on the line 66 which serves to reset the counters 40 and 41 also passes through a short delay device 68, an isolating diode 69, and a normally closed switch S2 to appear simultaneously on the "start" terminal 30a and the enabling line 62a for the timer 62. Thus, the servo circuits 30 will cause the tracing head 16 to resume its automatic following of the fascimile line 14, and the timer 62 will simultaneously begin another timing cycle. The sequence of operations described above will repeat over and over, with a successive set of $\Delta X$ and $\Delta Y$ numbers being registered in the counters and then recorded in successive blocks of thirteen rows of coded holes on the punched tape 55.

In this fashion, the head 16 will automatically trace the complete facsimile line 14 but in successive incremental steps. A block of data, including $\Delta X$ and $\Delta Y$ numbers, will be recorded on the punched tape for each successive step. When the line 14 has been completely traced in this manner, an operator may open the switch S2 to prevent restarting of the tracer equipment, and the apparatus as a whole will terminate its operation. It may be noted briefly that the diode 69 shown in FIG. 3 is merely a symbolic illustration of some means to prevent a signal from being applied to the output terminal EB of the decoder 52 when the start switch S1 is momentarily closed.

Observe that if the follower velocity knob 34 is adjusted to make the velocity of the head 16 along the line 14 equal to 0.1 inch per second (i.p.s.), and if the timer adjustment knob is set to make the successive time periods $t$ have a duration of 1.0 second, then the length of the successive increments $\Delta D$ along the line 14 will be $0.1 \times 1.0 = .100''$. At the same tracing velocity, if the timer 62 is adjusted to measure off 0.5 or 1.5 second periods, then the successive composite increment instances $\Delta D$ will be .050'' or .150'', respectively. In other words, by choosing a combination of the tracing velocity $v$ and the time period $t$, their product $v \cdot t$ may be made to result in any desired value for composite increments $\Delta D$ through which the head 16 will move prior to the recordation of successive pairs of displacement numbers $\Delta X$ and $\Delta Y$ on successive blocks on the punched tape 55.

Figure 4:
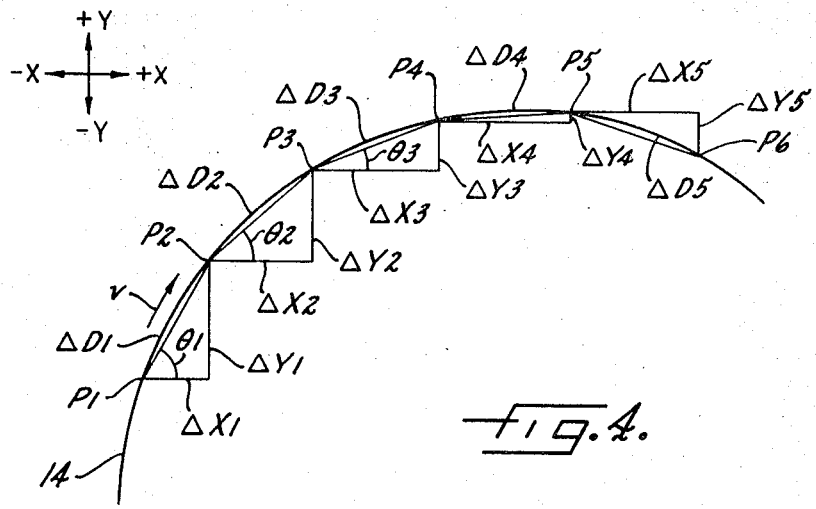
FIG. 4 is a graphic illustration of the manner in which a curved portion of a fascimile line will be followed by the tracing apparatus of FIG. 3, or the manner in which it may be followed and measured manually.

FIG. 4 illustrates the operation of tracing the line 14 in successive steps. If the head 16 (FIG. 3) starts in registry with a first point P1 (FIG. 4) and moves clockwise along the line with a given velocity $v$, and if the time interval $t$ is selected to have a given value, then when the head has traveled a distance $\Delta D_1$ which is equal to $v \cdot t$ and has reached the point P2, the counters 40 and 41 will numerically signal the values of the X and Y axis displacements $\Delta X_1$ and $\Delta Y_1$. These numerical representations will be recorded on the punched tape in one block of rows, as previously explained. Thereafter, the counters 40 and 41 will be reset and the head 16 restarted so that it moves the same distance $\Delta D_2$ from the point P2 to the point P3. During such movement, the counters will receive pulses to make them hold numbers representing the corresponding X and Y axis displacements $\Delta X_2$ and $\Delta Y_2$, and this pair of displacement numbers will be recorded in the next succeeding block of thirteen rows on the punched tape 55. In like manner, the tracing head will move from point P3 to point P4 and the displacements $\Delta X_3$ and $\Delta Y_3$ will be recorded in one block of rows on the punched tape; the head 16 will move from point P4 to point P5 through a composite distance increment $\Delta D_4$ equal to the previous increments, and the displacements $\Delta X_4$ and $\Delta Y_4$ will be recorded in the next succeeding block of the punched tape; and finally, the head 16 will move from point P5 to the point P6 through a composite increment $\Delta D_5$ equal to the preceding increments, and the displacements $+\Delta X_5$ and $-\Delta Y_5$ will be recorded in the next block of the punched tape.

Noteworthy is the fact that the magnitudes of the displacement numbers $\Delta X$ and $\Delta Y$ may change considerably from step to step of the tracing operation even though the composite distance increment $\Delta D$ remains constant at a certain value determined by the tracing velocity $v$ and the timer periods $t$ selected by setting the knobs 34 and 62c. Assuming that the distance increment $\Delta D$ is chosen to be so short that the difference between the chord and the arc during each step is negligible with respect to the tolerances or accuracy which is desired, the particular values of the $\Delta X$ and $\Delta Y$ numbers recorded during any given step will depend on the angle $\theta$ between the chord and the X axis. In particular, the displacement $\Delta X$ will be equal to $\Delta D \cos \theta$ and the displacement $\Delta Y$ will be equal to $\Delta D \sin \theta$. Because a right triangle is being dealt with in each case, the hypotenuse or increment $\Delta D$ will be equal to $\sqrt{\Delta X^2 + \Delta Y^2}$, and the angle $\theta$ may be defined as $\tan^{-1} \Delta Y/\Delta X$. When a curve is being traced, the angle $\theta$ will change from step to step as illustrated by the progressively smaller angles $\theta_1$, $\theta_2$, $\theta_3$ in FIG. 4.

The choice of the value for the successive distance increments $\Delta D$ is important in determining the composite vector velocity at which a controlled element will be moved subsequently in order to travel through the desired path originally represented by the facsimile line 14. This will be more fully explained below. It may be noted at this point, however, that the value of the composite distance increments $\Delta D$ is not directly dependent upon the vecolity with which the tracing head 16 follows the facsimile line 14, and any tracing velocity may be used in conjunction with appropriately valued time periods measured off by the time 62 in order to produce the desired value of the increments $\Delta D$. Moreover, while the value of the increments $\Delta D$ may be selected and changed by suitably adjusting the tracing velocity $v$ and the successive time periods $t$, other forms of apparatus may be employed for this purpose. For example, the angular displacements of the two lead screws 20 and 25 might be added as vectors displaced by 90° in a mechanical or electrical integrator, and the tracing motion terminated to permit recording of the measured $\Delta X$ and $\Delta Y$ displacements each time that the vector sum reaches a predetermined selectable value. In this procedure, the path tracing velocity will be totally irrelevant, and the tracing may be done at non-uniform velocities.

Figure 5:
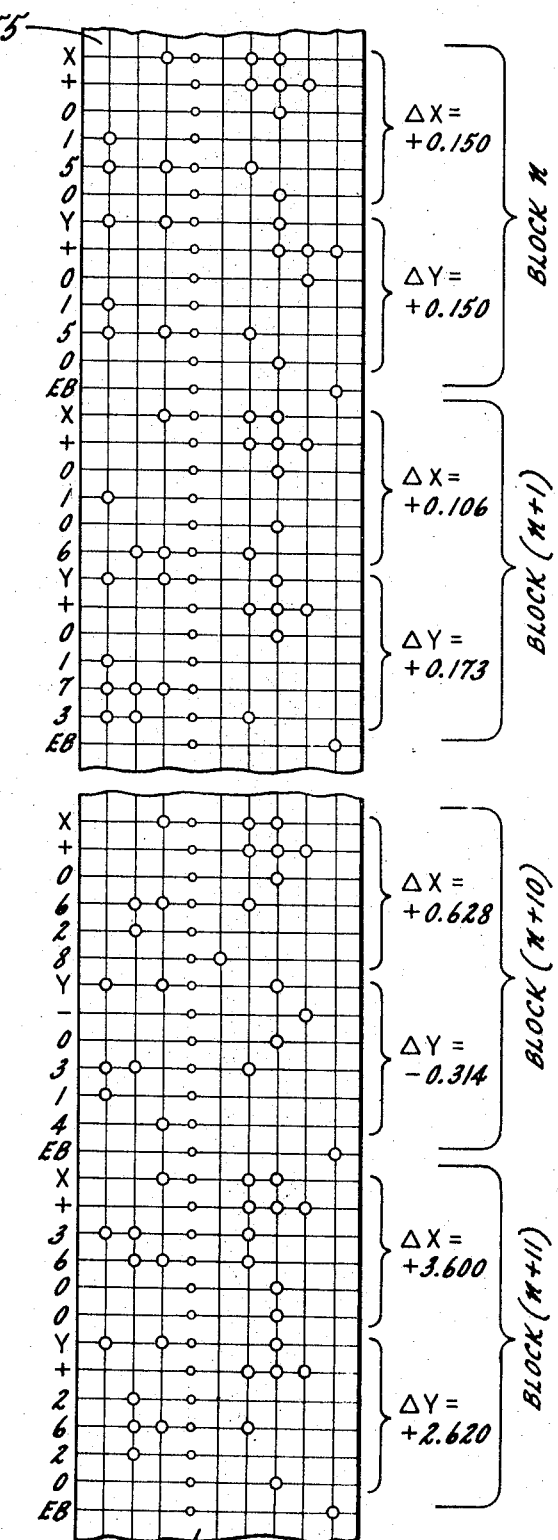
FIG. 5 illustrates a portion of an exemplary digital record or punched tape prepared in accordance with the practice of the present invention.

FIG. 5 illustrates four typical blocks or sets of data on the punched tape 55 after the latter has been prepared in the manner set forth above. The first block $n$ shown in FIG. 5 contains thirteen successive rows which by the holes therein represent the characters $X+0150Y+0150EB$ in the "Flex-O-Writer" code which is familiar to those skilled in the art of numerical controls. Since this block $n$ defines a $\Delta X$ displacement of $+0.150''$ and and a $\Delta Y$ displacement of $0.150''$, the angle $\theta$ for the resultant vector is $\tan^{-1} 1.0$, that is, 45°. The composite increment $\Delta D$ which was traced in order to arrive at these particular $\Delta X$ and $\Delta Y$ displacements is $0.150\sqrt{2} = 0.212''$. Such value for the composite increment $\Delta D$ would be obtained during the operation of the apparatus shown in FIG. 3, for example, by setting the knobs 34 and 62c to make the tracing value $v$ be 0.1 i.p.s. and the time periods $t$ be 2.12 seconds.

The second block $(n+1)$ which is shown on the punched tape 55 in FIG. 5 contains thirteen successive rows of holes representing the characters $X+0106Y+0173EB$ By taking the square root of the sum of the squares of ΔX and ΔY displacements .106″ and .173″, one sees that the composite distance increments is still .212″, but the angle θ for the composite vector represented by these data is $\tan^{-1} 106/173 = 60°$.

The next block labeled (n+10) in FIG. 5 contains coded representations for a ΔX number of +0.628 and a ΔY number of −0.314. These data will result in automatic limiting of axis velocities to a safe, maximum value at the machine tool, as more fully explained below. The fourth block (n+11) shown on the tape 55 in FIG. 5 also is typical of a case in which machine tool velocities will be limited to a safe maximum value, and the operation which results from processing of the represented ΔX and ΔY numbers equal to +3.660 and +4.800 will be described more fully below.

It should be noted that none of the data recorded on the punched tape 55 represents a commanded velocity of feed rate at which the movable element, such as a machine tool cutter, is to be moved around the desired contour path. Yet, as will become clear from the subsequent portions of this specification, the composite or path velocity of the movable element can and will (except in certain cases, to be described) be controlled so as to have desired values which are selected and determined by the choice of the composite increments ΔD during the tracing operation.

The next step in carrying out the present method is to move the controlled element, during successive equal time intervals along X and Y orthogonal axes through distances which are proportional to the ΔX and ΔY numbers in successive sets of recorded displacements. Such movement are carried out uniformly over the span of the corresponding time interval, i.e., at velocities $V_x$ and $V_y$ which are substantially uniform and do not change during any given one of said time intervals. Since each time interval is equal, the uniform axis velocities $V_x$ and $V_y$ during any interval are proportional to the ΔX and ΔY numbers applicable to that given interval. Again, this step may be carried out either manually or by utilization of a wide variety of control systems, but for purposes of specific description, it will be treated as accomplished by a linear interpolation "director" and servo systems of the general type described in McGarrell, U.S. Pat. 3,079,522. The present description may thus be made relatively abbreviated, and the reader may refer to the McGarrell patent if he wishes to have detailed information on any aspect of the director.

Figure 7:
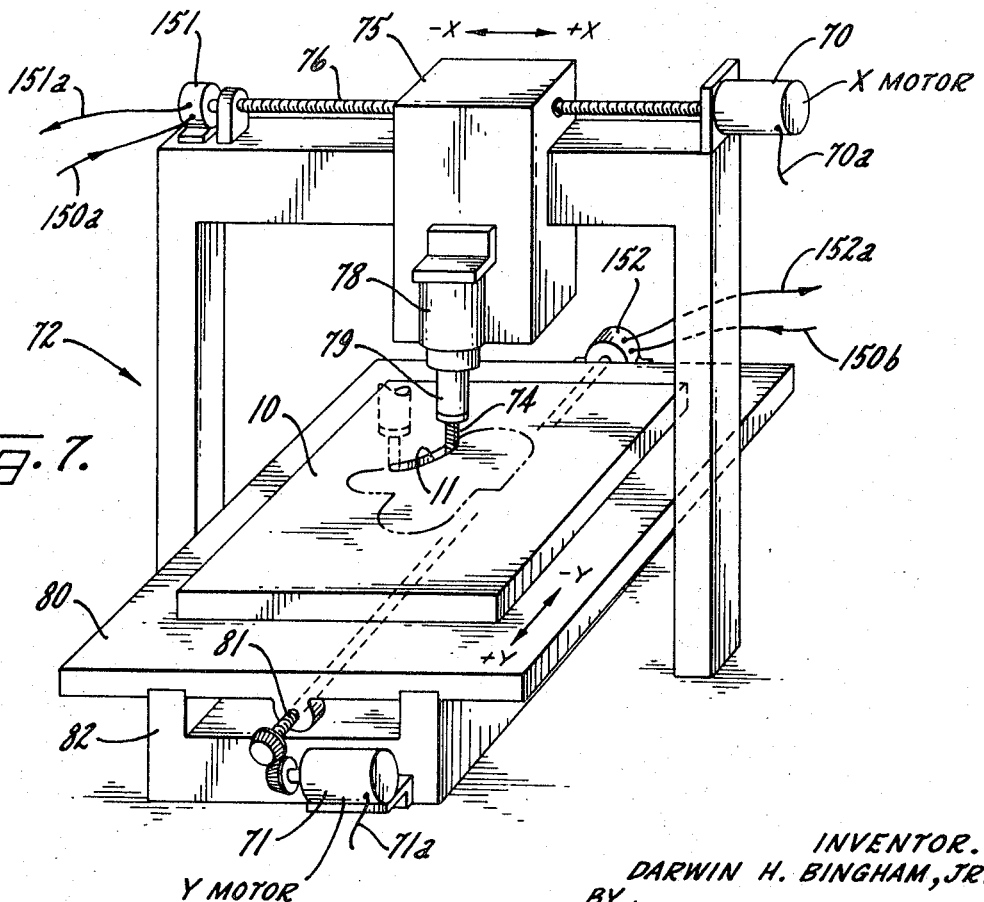
FIG. 7 is a simplified and diagrammatic perspective illustration of a two axis milling machine controlled by the director of FIG. 6.
Figure 6:
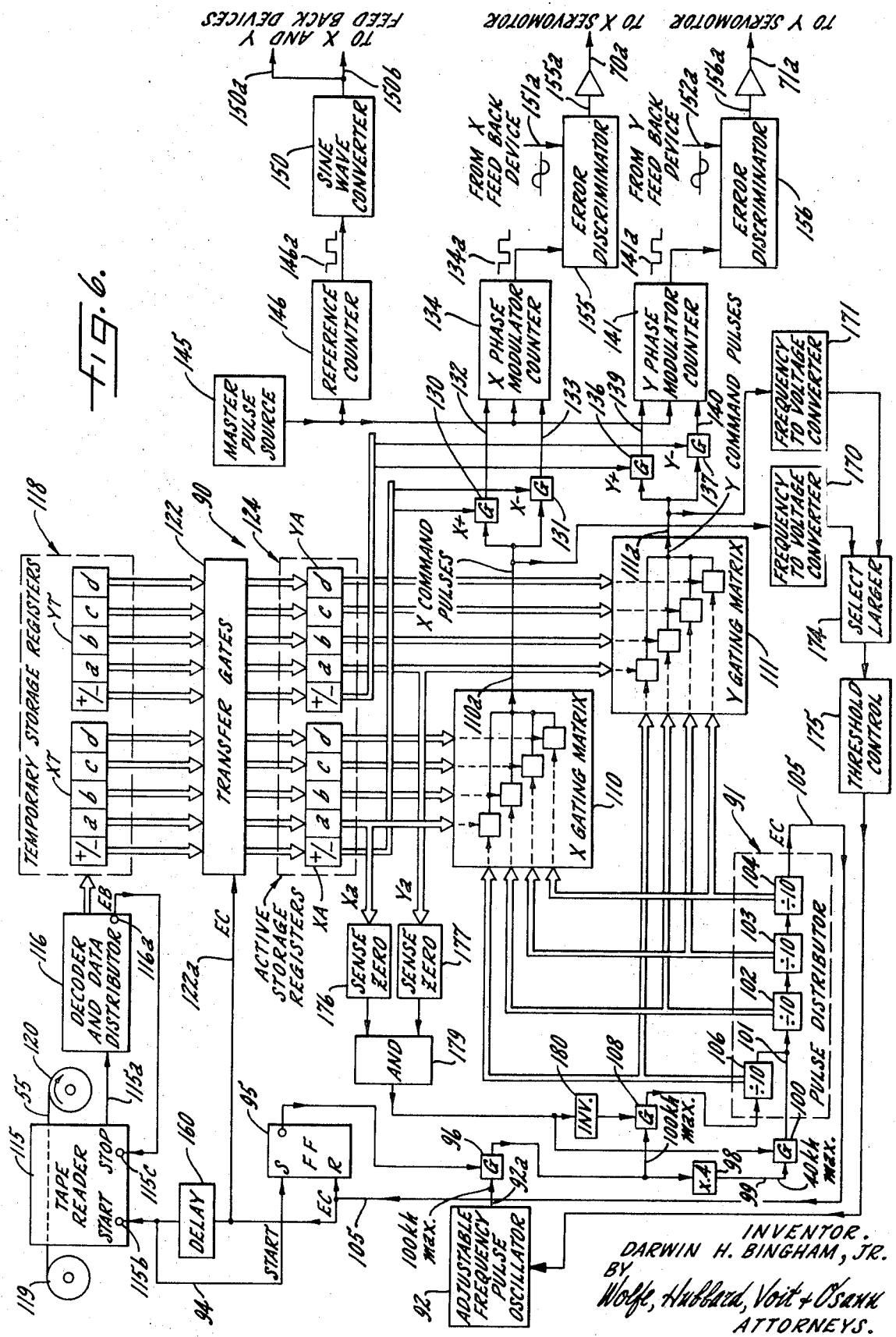
FIG. 6 is a diagrammatic illustration in block-and-line form of an exemplary interpolating director which may be employed to accept the record of FIG. 5 and to move an element such as a machine tool cutter along the desired path velocities.

FIG. 6 diagrammatically illustrates in simplified form a suitable and exemplary director which is to accept successive blocks of numerical command information from the punched tape 55 and to apply signals to the X and Y axis servomotors 70, 71 of a two-axis milling machine 72 (FIG. 7). In response to control signals applied to these servomotors, a rotating milling cutter 74 will move through the desired path, relative to the workpiece 10, originally represented by the line 14 in FIG. 2—and thus cut the contoured groove 11 illustrated in FIG. 1. It may be briefly noted with reference to FIG. 7 that the milling machine 72 includes a saddle 75 movable horizontally back and forth along a cross rail in response to a lead screw 76 being driven by the servomotor 70 in one direction or the other. The saddle 75 carries a milling head motor 78 (adjustable to different heights by means not shown) continuously rotating a tool holder which carries the cutter 74. The workpiece 10, on the other hand, is supported on a table 80 which is slidable back and forth along the ways of a bed 82, the table thus being translatable in positive or negative directions along a Y axis in response to rotation of a lead screw 81 driven in one direction or the other by the servomotor 71. Thus, it will be apparent that the cutter 74 may be driven along the X axis by controlled rotation of the motor 70 and the workpiece 10 may be driven along the Y axis by controlled rotation of the motor 71, the cutter in this way being movable along X and Y axes relative to the workpiece 10.

Referring now to FIG. 6, the director 90 as there shown includes means to measure off successive equal time intervals during which command pulses will be produced in response to the ΔX and ΔY command numbers contained in any block of data read from the punched tape. The time measuring means in this instance are constituted by a pulse distributor 91 associated with a source of recurring pulses having an adjustable, but normally constant frequency. For the present, it will be assumed that the pulse source is constituted by an oscillator 92 which produces recurring pulses at a constant frequency of 100 kHz. on its output line 92a. When a start signal is received on a line 94 to set a flip-flop 95, the binary "1" output voltage from the latter opens a gate 96 so that the 100 kHz. pulses pass from the line 92a through the gate and a fractional multiplier 98 (which multiplies by the fraction 4/10) so that a stream of source pulses at a frequency of 40 kHz. appears on a line 99, passes through a normally open gate 100, and thus is fed to the input line 101 of the pulse distributor.

The pulse distributor 91 includes three tandemly connected decade counters 102, 103, 104 which, in effect, have a total count capacity of 1000. That is, if the gate 96 is opened when the counters 102–104 are all in their "0" states, 1,000 input pulses must be received on the line 101 before an end carry pulse EC is produced on a carry line 105 from the last decade 104. The end carry pulse EC is routed via the line 105 to the reset terminal of the flip-flop 95, so that the latter is reset to close the gate 96 each time after the 1,000 pulses have been received on the input line 101 and the counters have counted through one full cycle to return to their "0" states.

Since the input pulses on line 101 have a normal, constant frequency of 40 kHz., i.e., 40,000 pulses per second, and since 1,000 pulses are required to produce an end carry pulse EC which will disconnect the pulse source and terminate the counting, each cycle of the three decade counter 100–104 will occupy a time interval of 1/40 or .025 second. It is by virtue of the repeated cycling of the pulse distributor 91 that the director 90 functions to measure off successive equal time intervals, and such intervals will here be assumed merely by way of example to be .025 second in duration. The significance of these equal time intervals will become apparent as the description proceeds.

A fourth decade counting stage 106 shown in the pulse distributor 91 is inactive except under certain conditions to be described later, and a gate 108 connected in its input line is normally closed.

Besides measuring off successive equal time intervals, however, the pulse distributor 91 serves another function in producing a plurality of streams of non-coincident potential command pulses. The three decade counters 102–104 are what may be termed BCD counters, each containing four bistate devices such as flip-flops interconnected by gates so that they scale by a factor of ten rather than a factor of sixteen. Preferably the interconnection of the bistate devices within each decade counter is chosen such that during one cycle of each decade counter it produces on its four non-carry output lines streams of 5, 2, 1 and 1 non-carry pulses, respectively, none of these being coincident in time. Thus, although the four non-carry output lines from each of the counters 102–104 have been shown in FIG. 6 as a four conductor trunk line, it will be understood that the first decade counter 102 will go through one hundred cycles during each cycle of the complete counter 102–104, thereby producing on its four non-carry output lines recurring streams of five hundred, two hundred, one hundred and one hundred pulses, respectively, during each complete cycle of the distributor 91. On the other hand, the second decade counter 103 will produce streams of fifty, twenty, ten and ten non-carry pulses during each complete cycle of the pulse distributor 91; and the third decade 104 will produce on its four non carry output lines streams of 5, 2, 1 and 1 pulses during each complete cycle of the distributor 91. As explained in the above-identified McGarrell patent, none of these non-carry pulses is coincident in time with any other pulse, and by collecting the pulses in different ones of the twelve streams, any number of pulses between 0 and 999 may be gathered into one stream of command pulses during a given complete cycle of the pulse distributor 91. All of the collected non-carry pulses will be substantially evenly spaced in time over the .025 second interval which is measured off during a single cycle of the pulse distributor 91.

As shown in FIG. 6, the non-carry output conductors from the three decade counters 102–104 are connected to the inputs of both an X gating matrix 110 and a Y gating matrix 111, the latter being controlled by command information as hereinafter described.

The director 90 further includes means for reading and storing the signed $\Delta X$ and $\Delta Y$ numbers which are recorded in successive blocks of the punched tape 55. For this purpose, a conventional tape reader 115 is arranged to read one block of data at a time from the punched tape 55 and to produce on its output lines 115a thirteen successive sets of digital signals which represent the character or integer symbolized by the successive rows of holes punched in the tape. These signals are passed to a decoder and data distributor 116 which in turn routes them to the proper locations in temporary storage registers 118.

More specifically, when a momentary signal is applied to the start terminal 115b of the tape reader 115, the latter begins stepping the tape 55 one row at a time from a supply reel 119 onto a take-up reel 120. As each row of holes passes a reading station, the presence or absence of a hole in each lengthwise column of the punched tape is sensed, and output signals corresponding to the character or numeral represented by that combination of holes in that row appears on the counter output lines 115a. When an "X" is read, the distributor 116 responds by routing the next five output signals from the reader to a temporary register XT, the sign and the decimal integers $\pm a.bcd$ of the $\Delta X$ number being stored in the $+/-$, $a$, $b$, $c$, $d$ sections of that register. The + or − sign may be stored by setting or resetting a single flip-flop in the $+/-$ section of the XT register. The remaining four sections of the register are decade stages each containing four bistate devices or flip-flops, and each such decade stage is set to represent in BCD notation (preferably a 5211 code) the value of the corresponding one of the numbers 0–9 read from the punched tape.

In like manner, the distributor 116 responds to a "Y" output signal from the reader 115 by routing the succeeding five output signals to the corresponding sections of $+/-$, $a$, $b$, $c$, $d$ of a temporary storage register YT, wherein the sign of the $\Delta Y$ number read from the punched tape is stored, and the value of the successively lower order digits, $a$, $b$, $c$ and $d$ are stored and signalled in BCD (e.g., 5211) code notation. The temporary storage registers 118 may be reset or cleared just prior to the reading in of a new block of data, or alternatively, the reception of fresh data may serve simply to destroy the numerical data previously stored. The latter arrangement will be assumed in the present instance.

When the tape reader 115 senses the last row representing the symbol EB in any given block on the punched tape, the decoder and data distributor 116 will produce a momentary signal on its EB output terminal 116a, and this signal is routed to the "stop" terminal 115c of the tape reader 115, thereby stopping the advancing and the reading of the tape 55.

Once the $\Delta X$ and $\Delta Y$ numbers for a given block are stored in the temporary registers XT and YT, they may be instantaneously transferred through a plurality of transfer gates 122 into a set of active storage registers 124. As here shown, the four bit output lines of each section in the XT and YT registers are connected to corresponding input terminals of the transfer gates 122, and the output terminals of the latter are connected to corresponding inputs of active registers XA and YA. Thus, in the arrangement here illustrated, it is only necessary to apply a momentary signal to the enabling line 122a for the transfer gates 22 to open all such gates, and this serves to transfer the contents of the registers XT and YT in parallel to the corresponding sections in the identical active registers XA and YA. The active registers XA and YA may be cleared prior to such a transfer through the gates 122, or the data previously stored in these active registers may be destroyed simply as an incident to storage of the new data. The latter arrangement will be assumed in the present instance.

The $\Delta X$ and $\Delta Y$ command numbers held in the active registers XA and YA determine the number of time spaced command pulses which are produced during one time interval measured off by the pulse distributor 105. As indicated in FIG. 6, the output lines of the four digit sections $a$, $b$, $c$, $d$ of the registers XA and YA are connected to the control inputs of the respective gating matrices 110 and 111. The operation of the direction will be described initially, however, with the assumption that the "$a$" digit of each stored number is zero, i.e., that the stored numbers are not larger than 0.999.

Depending upon the particular values of each digit in the active $\Delta X$ number, different combinations of gates in the matrix 110 will be opened to permit passage of non-carry pulses from different combinations of the non-carry output lines of the decades 102, 103, 104 in the pulse distributor 91 to a common collection or command pulse line 110a. The organization and operation of the gating matrix 110 is well known, and details thereof may be learned from the above-identified McGarrell patent. It will suffice simply to state that after a particular combination of the gate in the gating matrix have been opened in accordance with any $\Delta X$ number $0bcd$ held in the register $X_a$, then the number of command pulses appearing substantially uniformly spaced apart in time on the line 110a during one cycle of the distributor 91 will be equal to the value of the number represented by the digits $bcd$. For example, if the $\Delta X$ number in active storage is 0.196, then 196 command pulses will appear on the line 110a during the .025 second measured off by one cycle of the distributor 91. Correspondingly, if the $\Delta X$ number has any value between 0000 and 0999, then the quantity of command pulses will have the corresponding value between 0 and 999. This means that there is one X axis command pulse for each .001" of displacement represented by any $\Delta X$ number (assuming for the moment that such number is not greater than 999).

The Y axis gating matrix 111 functions in the same manner. During the same time interval of .025 second measured off by any cycle of the distributor 91, and during which X command pulses are being produced on the line 110a corresponding in quantity to the value of the $\Delta X$ number held in the register XA, a quantity of time-spaced Y axis command pulses will be passed through the gating matrix 111 to its output line 111A, such quantity being equal to the number represented by the $bcd$ digits of the $\Delta Y$ number held in the register YA. Therefore, during each cycle of the distributor 91, groups of time-spaced X and Y axis command pulses will appear on the lines 110a and 111a, the X and Y command pulses being proportional in number to the stored $\Delta X$ and $\Delta Y$ numbers and uniformly spaced over the time interval of .025 second for that cycle.

The X command pulses on line 110a are supplied to the inputs of two complementally controlled gates 130 and 131 which are governed by the sign of the $\Delta X$ number stored in the register XA. That is, the output lines from the $+/-$ section of the register of the register XA are connected to the gates 130 and 131 in a manner such that the latter will be respectively opened and closed when the stored sign is positive, and such that the gates 130 and 131 will be respectively closed and opened when the stored sign is negative. Thus, if the active command number ΔX is positive or negative, the X command pulses will be routed to a line 132 or a line 133, respectively, which form inputs to an X axis phase modulator counter 134.

The Y command pulses are similarly routed from the line 111a through either a gate 136 or a gate 137 depending upon whether the active command number ΔY stored in the register YA is positive or negative, such command pulses thus appearing either on a line 139 or a line 140 which form inputs to a Y phase modulator counter 141.

In review, when a given set of ΔX and ΔY numbers are placed in the active registers XA and YA, and the pulse distributor 91 is put through one cycle of operation to measure off a predetermined time interval T, the number of X and Y command pulses produced during and uniformly spaced within that interval will be proportional (and indeed, in this example, equal) to the active ΔX and ΔY numbers. But the frequency of these groups of command pulses will be:

$$f_x = \frac{\Delta X}{T} \qquad (a)$$

$$f_y = \frac{\Delta Y}{T} \qquad (b)$$

where T in the present example is .025 second. Thus, it may be said that in the present exemplary arrangement the frequency of any group of command pulses produced in response to one block of data is represented by the equation:

$$f_x = \frac{\Delta X}{.025} = (bcd \text{ of } \Delta X \text{ No.}) 40 \qquad (c)$$

$$f_y = \frac{\Delta Y}{.025} = (bcd \text{ of } \Delta Y \text{ No.}) 40 \qquad (d)$$

The minimum command pulse frequency will be zero when the displacement number is zero; and the maximum frequency will be approximately 40 kHz. when the displacement number is 999.

The remainder of the director and servo systems function to produce relative movement of the controlled element (e.g., the cutter 74 relative to the workpiece 10 as viewed in FIG. 7) along the X and Y axes a predetermined basic unit of distance in response to each X and Y command pulse as it arrives. In this way, the total displacement of the cutter 74 along the X and Y axes in response to a given block of data is made proportional to the total number of X and Y command pulses received. This, in turn, is proportional to the magnitude of ΔX and ΔY numbers. Moreover, the velocities $V_x$ and $V_y$ of the element along the X and Y axes are made proportional to the frequencies of the X and Y command pulses, and thus proportional to the ΔX and ΔY numbers. The sense of the motion of the cutter 74 along the X or Y axis corresponds to the signs of the ΔX or ΔY numbers.

The apparatus shown in the right portion of FIG. 6 is intended only generally, and not rigirously, to represent the phase modulation portion of the director and the associated servo circuits. Details may be had by reference to the aforementioned McGarrell patent. In functional terms, however, the phase modulation section of the director includes a master pulse source 145 which produces recurring pulses at a constant frequency, such pulses being made (by means not shown) non-coincident with any of the X and Y command pulses. The master pulses are supplied as inputs to a reference counter 146 and also to the X and Y modulator counters 134 and 141. These counters all have the same count capacity or dividing ratio, so that in the absence of any received command pulses, the recurring squarewaves 146a, 134a and 141a on their respective output lines will remain fixed in phase relative to the output wave 140a of the reference counter 146. However, in response to each command pulse on the line 132 or 133, the X modulator counter 134 registers one more or one less count compared to its response to the master pulses alone, and thus the phase of the squarewave 134a at the output of the counter 134 is advanced or retarded (relative to the phase of the reference wave 146a) by a predetermined small angular increment. Thus, the extent of the total phase shift of the wave 134a is proportional to the total number of X command pulses received by the modulator counter 134; the sense of such phase shift (either in the lagging or leading direction) corresponds to the sign of the command pulses (i.e., whether received on line 132 or 133); and the rate of phase shift is proportional to the frequency of the received command pulses.

The Y axis phase modulator counter 141 functions in the same way. Its recurring output squarewave 141a will shift in phase (relative to the reference wave 146a) by amounts corresponding to the number of received Y command pulses; in a sense corresponding to the sign of the command pulses; and at a rate proportional to the frequency of the received command pulses.

The reference squarewave 146a is passed through a converter 150 which converts it to sinusoidal form on terminals 150a and 150b, these terminals forming the stator excitation inputs for X and Y axis feedback devices 151 and 152 (FIG. 7) at the machine tool. These feedback devices may be phase-shifting inductive resolvers well known in the art, and it will be considered for convenience here that each includes a phase shift network for combining two rotor winding signals into single output waves on their respective output terminals 151a and 152a which shift in phase, relative to the excitation wave, according to the angle of the rotors therein. The rotors of the two resolvers 151 and 152 are respectively coupled to be driven with a predetermined mechanical ratio from the X and Y axis lead screws 76 and 81, so that the phase of the feedback signals appearing on lines 151a and 152a (relative to the reference wave 146a) is changed by predetermined amounts in a lagging or leading direction as the cutter 74 is moved through predetermined distance increments in positive or negative directions along the X and Y axes.

The variable phase feedback signals on lines 151a and 152a are coupled as inputs to phase error discriminators 155 and 156 (FIG. 6). These discriminators respectively receive the variable phase command waves 134a and 141a from the X and Y axis modulator counters 134 and 141. The discriminators function to produce DC voltages at their output terminals 155a and 156a which are proportional in magnitude and agreeable in sense to the extent and sign of the disagreement in phase of the two recurring waves supplied to their inputs. These DC error voltages are suitably amplified and applied as the energizing signals to the input terminals 70a and 71a of the DC servomotors 70 and 71, so that such motors are energized to turn their associated lead screws 76 and 81 in directions corresponding in sense to the polarity of, and at speeds proportional to the magnitudes of, such voltages.

Considering the closed loop servo for the X axis, as positive command pulses, are successively received on the line 132 and the recurring voltage wave 134a is progressively advanced in phase, the error voltage at the discriminator output 155a will tend to increase from zero and will become progressively larger with a positive polarity. However, this error voltage will cause the servomotor 70 (FIG. 7) to rotate the lead screw 76 in a direction which moves the cutter 74 in a positive sense along the X axis; and as an incident to this, the output wave on terminal 151a of the feedback resolver 151 will be advanced in phase. In consequence, the servomotor 70 tends to keep the two input waves applied to the discriminator 155 matched in phase and the error voltage reduced to zero. Thus, the movable element (cutter 74) is moved along the X axis through .001" in response to each X command pulse, and through total distances which are proportional to the quantity of command pulses received in any group. The direction of such movement corresponds to the sign of the X command pulses, and therefore to the sign of the ΔX number stored in the register XA. More importantly, the velocity $V_x$ of such movement along the X axis will be proportional to the frequency of the received command pulses, and since that frequency is proportional to the ΔX number held in the active register XA, the velocity will be proportional to the latter number.

These same relationships exist between the ΔY number held in the active register YA, the Y axis command pulses, the extent and velocity of movement by the cutter 74 along the Y axis relative to the workpiece 10 in the machine tool.

When the motions commanded by one block of data have been executed, the director almost immediately transfers the next block of information into the active registers 124 and the pulse distributor is restarted on another cycle. In this way, the movements commanded by successive blocks are executed in rapid succession and the cutter 74 does not come to rest at the end of each motion step. Because these successive motion steps may lie at any angle, resulting from the vector combination of the commanded X and Y distances which are executed simultaneously, and because the successive steps may constitute short chords of any arcuate portion of a desired motion path, any desired contour can be produced on a workpiece with reasonably fine tolerances, departures of the workpiece surface from precisely the desired curved shape amounting only to the perpendicular distance from the mid-point of any short chord to the corresponding arc of the theoretically perfect path.

Referring again to FIG. 6, when one block of data has been executed in a time period of .025 second measured off by the pulse distributor 91, an end carry pulse EC on line 105 resets the flip-flop 95 which in turn closes the gate 96 so that the counters 102, 103, 104 are stopped in their "0" states, and thus the flow of potential command pulses to the gating matrices 110, 111 is terminated. That same end carry pulse EC is routed via the line 105 to the enabling terminal 122a of the transfer gates 122, so that the next block of data is transferred immediately from the temporary registers 118 into the active registers 124. The end carry signal EC also passes through a short time delay device 160 and thence via line 94 to set the flip-flop 95 which in turn reopens the gate 96 so that pulses at a normally constant frequency of 40 kHz. are again supplied to the input line 101 and the pulse distributor 91 begins another cycle of operation. In this succeeding cycle, command pulses are passed through the gating matrices 110 and 111 in accordance with the new ΔX and ΔY numbers which have just been received in the active registers 124.

The output from the delay device 160 also is applied to the reader "start" terminal 115b to initiate the reading of the next block of data from the punched tape 55 into the temporary storage registers 118 where it is held in readiness for transfer into the active registers. When the reading of this block from the punched tape has been completed, the EB signal which appears on terminal 116a of the distributor 116 stops the operation of the tape reader 115.

From the preceding description, it will now be understood that the present method is practiced by tracing the facsimile or drawing line 14 representing the desired path with a tracing instrument such as a photoelectric head 16 (FIG. 3), measuring the successive ΔX and ΔY displacements of the head as it travels through successive equal but selectable increments ΔD, and recording its successive pairs of displacements ΔX and ΔY in numerical form on a digital record such as the punched tape 55. The tape is then read, and in response to each successive block or set of displacement numbers, an element such as the cutter 74 is moved during successive equal time intervals along the X and Y axes through distances which are proportional to the ΔX and ΔY numbers and at velocities $V_x$ and $V_y$ which are also proportional to the ΔX and ΔY numbers.

The ΔX and ΔY numbers in any block of data are in magnitude determined both by the selected value of the tracing increment ΔD and the angle θ at which a particular portion of the facsimile line 14 which is being traced lies relative to the X axis. But because the distances $X_d$ and $Y_d$ through which the cutter 74 will move in executing any block of data will be proportional (and indeed equal in the exemplary case described) to the ΔX and ΔY numbers in that block, the cutter 74 will have a resultant or composite movement which lies at the angle θ relative to the X axis, and which is in its distance $P_d$ along the path which is proportional (or equal to) the selected tracing increment ΔD. But still further, each vector distance increment $P_d$ along the path, and which corresponds to one block of command data, is executed by the cutter in an equal time interval T. Thus, the path velocity $V_p$ of the cutter 74 for all motion steps, irrespective of the values for the ΔX and ΔY numbers or the value of the angle θ, may be represented by the expression:

$$V_p = \frac{P_d}{T} = \frac{k\Delta D}{T} \qquad (1)$$

This relationship will be better understood by considering the vector diagrams of FIG. 8a which illustrate the distances and velocities of movement by the element as it executes the commands defined in block $n$ shown on the punched tape 55 in FIG. 5. In this block, the ΔX and ΔY command numbers are both 0.150, so that during one time interval of .025 second measured off in the director (FIG. 6), 150 X command pulses and 150 Y command pulses will be produced with substantially uniform time spacing. Since each command pulse has been assumed to produce .001″ of movement along its axis, it follows that the cutter 74 will simultaneously move a distance $X_d$ along the X axis of 0.150″ and a distance $Y_d$ along the Y axis of 0.150″ (as illustrated in FIG. 8a) in the time interval of .025 second. The resultant vector displacement or path distance $P_d$ which the cutter 74 moves thus lies at an angle θ which is $\tan^{-1} 150/150$ or 45°, and the length of that resultant distance is:

$$P_d = \frac{X_d}{\sin 45°} = \sqrt{.150^2 + .150^2} = .212'' \qquad (2)$$

The corresponding velocity vectors for the cutter 74 thus have the relationship illustrated by the velocity vector diagram in FIG. 8a. Because the distances represented by the distance vector diagram in FIG. 8a are all executed in .025 second, the X and Y axis velocities $V_x$ and $V_y$, and the composite vector or path velocity $V_d$ become:

$$V_x = \frac{0.150''}{.025 \text{ sec.}} = 6.0 \text{ i.p.s.} \qquad (3)$$

$$V_y = \frac{0.150''}{.025 \text{ sec.}} = 6.0 \text{ i.p.s.} \qquad (4)$$

$$V_p = \frac{.212''}{.025 \text{ sec.}} = 8.5 \text{ i.p.s.} \qquad (5)$$

It will be apparent simply from the values of ΔX and ΔY numbers contained in block $n$ of the punched tape that such numbers were produced during the operation of the tracing apparatus in FIG. 3 while the head 16 moved through a tracing increment ΔD of .212″. Such an increment might be obtained, for example, by setting the knob 34 to produce a tracing velocity $v$ of 0.1 i.p.s. and by setting the timer knob 62c so that the timer 62 measures off timer periods $t$ of 2.12 seconds.

Consider next the block $(n+1)$ shown in FIG. 5 as having ΔX and ΔY numbers of +0.106 and +0.173. Again, these particular ΔX and ΔY numbers were recorded on the punched tape as a result of the apparatus in FIG. 3 tracing an increment ΔD along the facsimile line 14 which lies at an angle θ which is tan⁻¹ .173/.106 or 60°, and which is $\sqrt{.106^2 + .173^2}$ or .212″ in length. Thus, the tracing increment ΔD which resulted in the data for blocks n and (n+1) in FIG. 5 is the same, i.e., .212″.

As shown in FIG. 8b, when the block (n+1) is executed, the cutter 74 will move simultaneously through distances $X_d$ and $Y_d$ of +.106 and +.173 along the X and Y axes. The resultant vector or path displacement $P_d$ will thus lie at an angle θ which is 60° and will be .212″ in length. All such movements represented by the distance vector diagram in FIG. 8b will occur in the same time interval of .025 second. Thus, the velocities represented by the velocity diagram in FIG. 8b will be:

$$V_x = \frac{.106''}{.025 \text{ sec.}} = 4.24 \text{ i.p.s.} \quad (6)$$

$$V_y = \frac{.173''}{.025 \text{ sec.}} = 6.92 \text{ i.p.s.} \quad (7)$$

$$V_p = \frac{.212''}{.025 \text{ sec.}} = 8.5 \text{ i.p.s.} \quad (8)$$

Thus, so long as the tracing increment ΔD remains at the same selected value (.212″ in the example represented by FIGS. 8a and 8b), the path velocity $V_p$ at which the cutter will move will be the same irrespective of the angle θ at which the path motion occurs and irrespective of the particular values of the ΔX and ΔY numbers contained in any block of data. As a corollary, it may be stated that the path velocity $V_p$ will be proportional to the selected value of the tracing increment ΔD, and thus the path velocity $V_p$ of the movable element or cutter may be increased or decreased to any desired value by increasing or decreasing the selected value of the tracing increment ΔD. This is the significance of Equation 1, supra.

As specifically described here by way of example, the tracing apparatus of FIG. 3 and the director of FIG. 6 are organized to make the proportionality factor $k$ in Equation 1 unity, and to make the time interval T equal to .025 second. For this exemplary arrangement, therefore, Equation 1 may be rewritten to express the path velocity $V_p$:

$$V_p = \Delta D \cdot 10^3 \cdot 40 \text{ i.p.s.} \quad (9)$$

where ΔD is expressed in inches. But as noted above, the tracing increment ΔD is the product of the path velocity $v$ and the selected time periods $t$ during which each set of ΔX and ΔY numbers are produced in the tracing apparatus of FIG. 3. Therefore, for the specific example here described, one may write:

$$V_p = v \cdot t \cdot 40 \quad (10)$$

where $V_p$ is the composite vector or path velocity (i.p.s.) moved by the cutter 74 during the execution of any block of data which has been obtained in the first instance by tracing the facsimile line 14 at a path velocity $v$ (i.p.s.) for a time period $t$ (seconds). From this relationship, the following table may be prepared:

TABLE I

| $v$, i.p.s. | $t$, sec. | ΔD, inches | $V_p$ i.p.s. |
|---|---|---|---|
| .30 | .017 | .005 | 0.20 |
| .30 | .033 | .010 | 0.40 |
| .30 | .067 | .020 | .080 |
| .30 | .100 | .030 | 1.20 |
| .30 | .200 | .060 | 2.40 |
| .30 | .333 | .100 | 4.00 |
| .30 | .500 | .150 | 6.00 |
| .30 | .666 | .200 | 8.00 |
| .30 | .705 | .212 | 8.48 |
| .30 | .833 | .250 | 10.0 |

From Table I it may be seen that the path velocity $V_p$ or feed rate at which the cutter 74 will travel around any desired path may, in the practice of the present invention, be determined and controlled to have any desired value simply by selecting different values of the tracing increment ΔD, and in the specific example here described, simply by adjusting the duration of the successive time periods $t$ measured off by the timer 62 (FIG. 3) while leaving the tracing velocity $v$ set to a particular value (such as 0.30 i.p.s.). Thus, while the facsimile line 14 is being traced by the apparatus of FIG. 3, an operator may select different values of the final path velocity $V_p$ simply by setting the timer knob 62c so as to make the tracing increment ΔD have a particular value, and the cutter 74 will later be moved at a corresponding constant path velocity $V_p$ as it executes successive blocks of data. But by changing the timer periods $t$, the operator may cause the cutter velocity as it moves through different portions of the complete path represented by the line 14 to have different, particular values.

The practice of the present method permits a movable element such as the cutter 74 to be translated through any desired contoured path with a desired velocity, and yet it does not require that any information be placed on the punched tape to represent velocities, feed rates or time cycles. The preparation of the punched tape is made considerably more convenient and simpler than would be the case if separate velocity command information had to be placed on the punched tape. Moreover, if the present invention is practiced by using an interpolating director and servo controls to carry out the final step of moving the element through the desired path, the director can be made considerably less complex and less expensive in comparison to conventional directors which require circuitry which responds to feed rate or time cycle data contained on a punched tape. As a specific example, the "clock cycle control" shown at 46 in FIGS. 5 and 7 of the above-identified McGarrell patent may be totally eliminated from a director of the type there described. The elimination of the "clock cycle control" or velocity command processing portions of a director also permits the omission of apparatus to decode velocity designating command information contained on the punched tape, as well as temporary and active storage registers which would be necessary to receive that sort of information if it were read from the punched tape.

In many practical applications of the method which has been described, there will be an upper limit to the velocities $V_x$ and $V_y$ at which the controlled element may be moved along X and Y axes. For instance, the servomotors 70 and 71 (FIG. 7) may have maximum rated speeds at which they can drive their lead screws. The limitations on axis velocities does not limit the applicability of the method described above, but it imposes the restriction that if the tracing increment ΔD is chosen to be greater than some predetermined value, then the path velocity $V_p$ of the cutter 74 will not be directly proportional to and directly determined by that increment ΔD.

As an example, let it be assumed that the maximum velocity $V_x$ or $V_y$ at which the saddle 75 or table 80 (FIG. 7) can be moved is 10 i.p.s. This means that the frequency of the X or Y command pulses produced in the director 90 (FIG. 6) must not exceed 10,000 pulses per second, i.e., 10 kilohertz. Otherwise, the servo systems will not accurately follow the commands which are represented by the command pulses.

Recalling that in the previous description of the director it was assumed that the time intervals T measuerd off by the pulse distributor 91 are normally .025 second in duration, it will be understood that if the ΔX or ΔY command number in any block of data is .250″, then the frequency of the corresponding command pulses will be .250/.025 = 10 kHz. Thus, if either ΔX or ΔY number in any block exceeds the predetermined value of .250″, then the frequency of the corresponding command pulses would tend to exceed 10 kHz. and the axis velocity at the machine tool would tend to exceed the maximum permissible value of 10 i.p.s.

To obviate this tendency to produce excessive axis velocities and the loss of control which it would entail, provision is made in the director 90 to limit automatically the X and Y axis command frequencies so that they do not exceed 10 kHz. For this purpose, the X and Y command pulses are fed to frequency-to-voltage converters 170 and 171 (FIG. 6), and the output voltages of the latter are employed in a closed loop to reduce the frequency of the oscillator 92 whenever either X or Y command pulse frequency tends to exceed 10 kHz. In functional terms, the DC voltages from the converters 170 and 171 are passed into a "select larger" circuit 174 and then to a "threshold control" 175 which supplies a frequency-controlling signal to the oscillator 92. When the larger one of the two output voltages from the converters 170, 171 is transmitted through the circuit 174, and as the input to the threshold circuit 175 exceeds a certain value representing the fact that one of the two command pulse frequencies is above the maximum value of 10 kHz., then the output signal from the threshold circuit 175 is changed in magnitude to reduce the frequency of the controllable oscillator 92 until the highest one of the two command pulse frequencies is lowered to the maximum permissible value of 10 kHz.

So long as neither the ΔX nor the ΔY number of any block contained in the active storage registers 124 exceeds .250", then neither the X nor the Y command pulse train will tend to exceed a frequency of 10 kHz., and the frequency of the oscillator 92 is left at the normal, constant value of 100 kHz. Thus, normally each successive time intervals T measured off by successive cycles of the pulse distributor 91 is .025 second. Consider the operation as it will result, however, from a block of data such as that shown for block (n+10) in FIG. 5 and wherein the ΔX and ΔY numbers are respectively +0.628 and −0.314. These numbers for the block (n+10) will appear as a result of the facsimile line 14 (FIG. 3) having been traced over an increment ΔD of .706" at an angle θ of −26.6°. When this block of data is placed in the active registers 124, and the pulse distributor 91 begins a cycle of operation, the X and Y axis command pulses tend to have a frequency in excess of 10 kHz. But the frequency-to-voltage converter 170 produces a larger output voltage than the converter 171, and the threshold control 175 produces a change in its output signal so as to reduce the frequency of the oscillator 92 by an amount which makes the X axis command pulses equal to the maximum permissible value of 10 kHz. This means that 628 X command pulses will be produced at a frequency of 10 kHz., requiring that the pulse distributor cycle extend over a time interval T of 0.628 second. To work through a full cycle in 0.628 second, the pulse distributor must receive 1,000 pulses on its input line 101 in that time interval, and thus the input frequency on the input line 101 must be 1000/0.628=15.9 kHz. Since the frequency on the line 101 is normally 40 kHz., the frequency of the oscillator 92 must be reduced from its normal value of 100 kHz. down to a value of 39.8 kHz. Such reduction in the oscillator frequency is effected by the closed feedback loop which includes converters 170, 171, the "select larger" circuit 174, and the threshold control 175, which change the control voltage applied to the oscillator 92 to reduce its frequency from 100 kHz. to 39.8 kHz. when the ΔX number has a value of .628. It will be understood that the particular one of the axis command pulse frequencies which tends to have the higher value controls the reduction in frequency of the oscillator 92, so that it is the command pulses for the axis having the larger displacement number which are limited to the maximum value of 10 kHz.

During the cycle of the pulse distributor 91 for the exemplary block (n+10), 628 X command pulses and 314 negative Y command pulses will appear (on lines 132 and 140, FIG. 6) substantially evenly spaced within a time interval of .0628 second. Thus, as shown in the distance vector diagram of FIG. 8c, the cutter 74 at the machine tool will move +.628" along the X axis, −.314" along the Y axis, and a distance $P_d$ of .706" along the resultant vector or path—all in a period of .0628 second. The velocities in the corresponding velocity vector diagram will thus be:

$$V_x = \frac{.628}{.0628} = 10.0 \text{ i.p.s. (max.)} \quad (11)$$

$$V_y = \frac{.314}{.0628} = 5.0 \text{ i.p.s.} \quad (12)$$

$$V_p = \frac{.709}{.0628} = 11.3 \text{ i.p.s.} \quad (13)$$

From this example, it becomes clear that whenever the commanded displacement along any axis exceeds a .250" in any block, then the time interval T, which is normally .025 second, for processing and executing that block in the director will be lengthened sufficiently to limit the maximum command pulse frequency to 10 kHz., and thus to limit the maximum axis velocity at the machine tool to 10 i.p.s. The commanded axis distances $X_d$ and $Y_d$ will be executed by the cutter of the machine tool, and the path distance $P_d$ will lie at the angle θ whose tangent is ΔY/ΔX, but the path velocity $V_p$ will be reduced relative to that which would otherwise be obtained. For example, the data block (n+10) shown in FIG. 5 was originally created by tracing the facsimile line 14 with a tracing increment ΔD of a .706", and from Equation 9, supra, the expected path velocity $V_p$ would be 28.2 i.p.s. But, as a result of "scaling down" the axis velocity $V_x$ to the maximum value of 10 i.p.s., the block (n+10) is executed by the cutter 74 moving at a considerably lower path velocity $V_p$ of 11.3 i.p.s.

Therefore, the practice of the present invention permits the path velocity of a movable element to be accurately controlled by selection of the value of the tracing increment ΔD, but in the event that the operator inadvertently or purposely chooses a ΔD value which is so large as to call for an impossibly high axis velocity, the proportionality between the tracing increment ΔD and the path velocity $V_p$ is discarded automatically, the relationship expressed by Equation 9, supra, is no longer applicable, and the velocity of the cutter 74 along all axes and the resultant vector are scaled down so that the maximum permissible axis velocity is not exceeded. All of this is accomplished by lengthening one of the time intervals T so that it is greater than the normally equal values for such intervals.

Thus far the operation of the director 90 has been described for ΔX and ΔY numbers which fall between the values 0 and .999, although the temporary and active registers 123 and 124 have a capacity to store ΔX and ΔY numbers which fall between 0 and 9.999. While in the specific arrangement here described, the method may be practiced with control of the movable element's path velocity $V_p$ so long as the chosen tracing increment ΔD is not so large as to result in ΔX or ΔY numbers which exceed .250", the method may be practiced without precise path velocity control by selecting tracing increments ΔD which are very large, and indeed which result in ΔX or ΔY numbers as large as 9.999.

To handle such large displacement numbers, the effective orgnaization and operation of the pulse distributor 91 is automatically modified when a ΔX or ΔY number greater than .999 is received in active storage. As shown in FIG. 6, the "a" digit section of the active registers XA and YA are coupled to the inputs of "sense zero" circuits 176 and 177 which will produce logic "1" output voltages only when the units or "a" digit values of the stored ΔX and ΔY numbers are zero. Thus, so long as the ΔX and ΔY numbers are both no greater than .999, the output of an associated AND gate 179 will be at a logic "1" level, thereby opening the previously mentioned normally open gate 100. Under these conditions, the output of the AND gate is converted to a logic "0" level by an inverter 180, and the output signal of the latter thus maintains the gate 108 normally closed. The operation of the director is thus as previously described. If, however, one of the stored ΔX and ΔY numbers is greater than .999 and thus its "a" digit has some value other than zero, then the output of at least one of the "sense zero" circuits will be at a logic "0" level, and the output of the AND gate 179 will also be a logic "0." With this, the gate 100 is closed, and the gate 108 is opened.

Under these latter circumstances, pulses at a normal frequency of 100 kHz. will be passed through the gate 108 to the decade counter 106, and carry pulses from the latter will be supplied to the input of the decade counter 102. Thus, a four decade counter 106, 102, 103, 104 is formed, having a count capacity of 10,000 input pulses before an end carry signal EC will appear on the line 105.

With the input frequency for the pulses passed through the gate 108 normally at 100 kHz., 0.1 second will be required for the modified pulse distributor to complete one cycle of operation. And, during each such cycle, the decade counter 106 will produce on its four non-carry output lines 5,000, 2,000, 1,000 and 1,000 non-coincident potential command pulses. These are routed as inputs to the gating matrices 110, 111, and they are selectively gated to the corresponding output lines 110a, 111a according to the values of "a" digits held in the XA and YA registers. The director now has the capacity to produce during each cycle any number of X command pulses or Y command pulses from 0 to 9,999; and the number of command pulses actually produced during any cycle of the pulse distributor 91 will be equal to the number of thousandths of an inch represented by the ΔX and ΔY numbers held in active registers.

If the ΔX number is 1.000, there will be 1,000 X command pulses produced in the 0.1 second interval measured off by the pulse distributor, making the X command pulse frequency 10 kHz. and the velocity $V_x$ of the cutter 74 the assumed maximum of 10 i.p.s. Thus, in the specific arrangement here shown by way of example, the "scaling down" of velocities to a safe maximum will occur whenever the larger one of the ΔX and ΔY numbers lies between .250 and .999, or whenever it exceeds 1.000. When the larger of the ΔX and ΔY numbers is actually 1.000, the velocity along the corresponding axis will in any event have the maximum value of 10 i.p.s. Therefore, by the choice of a tracing increment ΔD which makes either the ΔX or ΔY number greater than .250, the machine tool is made to work at its fastest possible feed rate because at least one axis of motion will be operating with its maximum velocity.

The operation of the director 90 when one or both of the ΔX or ΔY numbers exceeds 1.000 may be briefly described with reference to the block (n+11) shown in FIG. 5 and the corresponding vector diagrams in FIG. 8d. When the ΔX and ΔY numbers of +3.600 and +2.620 for this block are received in the active storage registers XA and YA, the gates 100 and 108 will be respectively closed and opened, as previously explained. The pulse distributor 91 will functionally include four decade counters in tandem receiving input pulses at a normal frequency of 100 kHz. from the oscillator 92. However, the X and Y command pulse frequencies will tend to rise to values of 3600/.1 second=36 kHz. and 2620/.1 second=26,20 kHz., so that the threshold circuit 175 will vary its output signal to reduce the frequency of the oscillator 92 sufficiently to make the larger command pulse frequency equal to the maximum permissible value of 10 kHz. In result, the X command pulse frequency is reduced to 10 kHz. so that 3,600 X command pulses will be produced in .36 second by reducing the frequency of the oscillator 92 from 100 kHz. to 27.8 kHz. Thus, during one cycle of the pulse distributor, the gating matrices will produce 3,600 command pulses and 2,620 Y command pulses equally spaced over a .36 second interval. The cutter 74 will thus be moved distances $X_d$ and $Y_d$ equal to 3.600" and 2.620" as shown in FIG. 8d. The cutter will move along the path or resultant vector at an angle of 36°, and through a composite path distance of 4.450". As shown by the velocity diagram in FIG. 8a, the component and resultant velocities will be:

$$V_x = \frac{3.600''}{.36 \text{ sec.}} = 10 \text{ i.p.s. (max.)} \qquad (14)$$

$$V_y = \frac{2.620''}{.36 \text{ sec.}} = 7.27 \text{ i.p.s.} \qquad (15)$$

$$V_p = \frac{4.450''}{.36 \text{ sec.}} = 12.4 \text{ i.p.s.} \qquad (16)$$

The ΔX and ΔY numbers for the block (n+11) were obtained originally by tracing the facsimile line 14 in FIG. 3 over an increment ΔD of 4.45". However, the path velocity $V_p$ of 12.4 i.p.s. is not directly proportional to the tracing increment because the "scaling down" which limits the higher axis velocity $V_x$ to the assumed safe value of 10 i.p.s.

In review, the method here described enables a movable element, such as the cutter 74, to be translated along any path of arbitrarily linear or curved shape by a numerical control procedure which requires no mental compilation of a mass of numerical data. A scale facsimile of the desired path is simply traced in order to obtain the necessary successive blocks of command numbers on a digital record. The record need contain no velocity-designating information, yet the velocity at which the element ultimately moves along the desired path is accurately determined and controlled by selecting successive composite increments ΔD during the tracing operation.

Although the present method has here been described with reference to specific examples of a preferred tracing apparatus (FIG. 3) and an exemplary interpolating director (FIGS. 6 and 7), it is to be understood that any of a wide variety of devices may be used to carry out the prescribed steps of the method. Instead of two-axis tracing and two-axis motions of the element, the procedure may be used for three (or more) axes. Of course, the designations "X" and "Y" axis herein are representative, and the axes may be given any desired symbolic name. Moreover, while in the present description it has been assumed that a "full size" facsimile of the desired path is traced in the first instance, either an under-size or an over-size facsimile may be traced in order ultimately to move the control element through a path of corresponding shape and desired size, simply by changing one or more of the several factors of proportionality. For example, if the pulse generators 35 and 36 (FIG. 3) are geared to their associated lead screws so as to produce one pulse for each .0005" of displacement of the head 16 along the X and Y axes, and the apparatus is otherwise unchanged, then the path of movement executed by the cutter 74 will be twice as big as the facsimile which is traced. As another example, the phase modulator and servo drives described with reference to FIG. 6 may be modified to make the cutter 74 move either .002" or .0005" along an axis in response to each command pulse, rather than the .001" previously assumed. If the system were otherwise unchanged, the path executed by the cutter 74 would be one-half or double size, respectively, but of the same shape, with respect to the traced facsimile.

Finally, it will be apparent that the tracing apparatus of FIG. 3 and the director of FIG. 6 may be constructed to produce, signal, store and utilize numerical representations signalled in codes other than binary decimal codes, and with a desired number of digit places other than the four which have been here described. These are matters of choice for one skilled in the art, and the invention is not to be limited to the particular details which have here been assumed by way of example for clarity of description.

I claim as my invention:

1. The method of moving an element through any desired path which may include curved and linear portions while controlling its velocity along the path, comprising
    (a) tracing a scale facsimile of the desired path with a measuring instrument,
    (b) recording in coded digital notation successive pairs of plural digit decimal numbers signifying the displacements $\Delta X$ and $\Delta Y$ of the instrument along X and Y orthogonal axes as the result of the instrument traveling through successive equal but selectable composite increments $\Delta D$,
    (c) thereafter measuring off successive equal time intervals,
    (d) and moving said element during successive ones of said intervals simultaneously and uniformly along X and Y orthogonal axes through distances proportional to the successive pairs of recorded $\Delta X$ and $\Delta Y$ numbers, and
    (e) selecting the value of the tracing increments $\Delta D$ in order to determine the path velocity at which the element is moved.

2. The method of moving an element through any desired path of arbitrary shape while controlling its velocity along the path, comprising
    (a) tracing a scale facsimile of the desired path with a tracing instrument,
    (b) recording in coded digital notation the successive paired sets of plural digit decimal numbers indicative of displacements $\Delta X$ and $\Delta Y$ of the instrumental along X and Y orthogonal axes as a result of the instrumental traveling through successive equal but selectable composite increments $\Delta D$ along the facsimile,
    (c) thereafter utilizing the recorded paired sets of numbers one set at a time and moving said element during successive equal time intervals simultaneously and uniformly along X and Y orthogonal axes through distances proportional to the displacements $\Delta X$ and $\Delta Y$ indicated by the successive recorded paired sets, so that the resultant composite velocity $V_p$ of the element along the path is proportional to the value of the composite increments $\Delta D$, and
    (d) selecting different values of the increments $\Delta D$ during tracing of said facsimile in order to produce different desired values of said composite velocity $V_p$ during the subsequent movement of said element.

3. The method of moving an element through a path of predetermined, desired shape while controlling its velocity along the path, comprising
    (a) making a scale facsimile of the path,
    (b) tracing the scale facsimile with a tracing instrument,
    (c) measuring the displacements of the instrument along orthogonal X and Y axes as the result of the instrument being moved through successive selectable composite incremental distances $\Delta D$,
    (d) recording in coded digital notation successive sets of numbers indicative of the values of the successive sets of measured X and Y axis displacements,
    (e) utilizing said recorded successive sets of numbers during successive equal time intervals to move the element simultaneously along X and Y orthogonal axes through distances proportional to the numerically represented X and Y axis displacements and at respective X and Y velocities which remain substantially uniform during any given one of said time intervals, and
    (f) selecting different values for the incremental distance $\Delta D$ in order to make the composite velocity of said element have different desired values.

4. The method of moving an element through a path of any arbitrary desired shape while nevertheless controlling its velocity along the path, comprising
    (a) following a scale facsimile of the path with a tracing instrument, at a selectable composite velocity $v$,
    (b) measuring off successive equal but selectable time periods $t$ while the facsimile is being followed,
    (c) measuring the displacements $\Delta X$ and $\Delta Y$ of the instrument along orthogonal X and Y axes during each one of said successive time periods $t$,
    (d) recording in the form of successive sets of numbers the values of such successive sets of measured displacements,
    (e) utilizing said recorded sets of numbers to move the element, during successive equal time intervals T, simultaneously along X and Y orthogonal axes through distances $X_d$ and $Y_d$ respectively proportional to the $\Delta X$ and $\Delta Y$ displacements represented by the successive sets of recorded numbers, and at velocities $V_x$ and $V_y$ along the X and Y axis which make the ratio $V_x/V_y$ equal to the ratio $\Delta X/\Delta Y$, and
    (f) selecting different values for the product $v \cdot t$ of said velocity $v$ and said time periods $t$ in order to make the composite velocity of said element have different desired values.

5. The method of moving an element through any desired path made up of linear portions, mathematically or dimensionally definable arcuate portions, or arbitrary and mathematically indefinable portions, while controlling the composite velocity of the member along the path, comprising
    (a) making a scale facsimile of the desired path,
    (b) following the facsimile with a tracing instrument,
    (c) registering in first and second counters the numbers $\Delta X$ and $\Delta Y$ of basic units through which said instrument moves along orthogonal X and Y axes, respectively,
    (d) recording the counts contained in said counters and resetting such counters after said instrument has moved through each successive equal but selectable composite increment $\Delta D$, thereby to make a record of successive sets of $\Delta X$ and $\Delta Y$ displacement numbers,
    (e) reading the successive sets of $\Delta X$ and $\Delta Y$ numbers from the record and, during successive equal time intervals, causing said element to move through distances $X_d$ and $Y_d$, and at velocities $V_x$ and $V_y$, which are respectively proportional to the $\Delta X$ and $\Delta Y$ numbers in successive sets, and
    (f) selecting the value of the composite increment $\Delta D$ to select and establish the composite velocity of said element as it moves along the desired path.

6. The method of moving an element through a desired path which may include linear and curved portions while controlling its velocity along the path, comprising
    (a) tracing a scale facsimile of the path with a tracing instrument,
    (b) counting in first and second counters the numbers of basic unit of movement of said instrument along X and Y orthogonal axes thereby to register in said counters numbers representing the displacements $\Delta X$ and $\Delta Y$ of the instrument along the X and Y axes,
    (c) interrupting the tracing movement of the instrument after the latter has traveled through each of a succession of equal but selectable composite increments $\Delta D$ along the facsimile,
    (d) transferring the $\Delta X$ and $\Delta Y$ numbers held in said counters to a digital record after each such interruption,
    (e) resetting said counters after each such transfer,
    (f) restarting the tracing movement of the instrument after each such resetting,
    (g) measuring off successive equal time intervals,
    (h) moving said element uniformly during successive ones of said time intervals simultaneously along X and Y orthogonal axes through distances $X_d$ and $Y_d$ which are respectively proportional to the $\Delta X$ and $\Delta Y$ numbers which were successively applied to said record, and
    (i) selecting or changing the value of the composite increments ΔD to determine or change the composite velocity of said element which results from its simultaneous motions along the X and Y axes.

7. The method set forth in claim 6 wherein the counters are multi-digit counters and the numbers registered therein are multi-digit numbers, and wherein said transferring step includes, after each said interruption,
(a) reading out seriatim the successive integers of the multi-digit number contained in one of said counters and recording said integers in succession on said digital record,
(b) reading out seriatim the successive integers of the multi-digit number contained in the other of said counters and recording said integers in succession on said digital record, and
(c) after such read-out of both counters applying an end of block symbol on said record.

8. The method of moving an element through a path of any arbitrary desired shape while controlling its velocity along the path, comprising
(a) tracing a scale facsimile of the path with a tracing instrument,
(b) accumulating in numerical notation the displacements ΔX and ΔY of the instrument along orthogonal X and Y axes,
(c) recording the accumulated ΔX and ΔY displacement numbers each time that the tracing instrument travels a selectable composite incremental distance ΔD, and restarting the accumulation, thereby the record a plurality of successive sets of ΔX and ΔY numbers,
(d) utilizing the successive sets of the recorded ΔX and ΔY numbers, during successive equal time intervals, to generate successive groups of X and Y command pulses respectively proportional in quantity to the numbers in each set and substantially equally spaced in time within said intervals,
(e) moving said element along orthogonal X and Y axes a predetermined distance in response respectively to each X and Y command pulse, and
(f) selecting different values for the said incremental distance ΔD in order to make the composite velocity of the element which results from its motion along the X and Y axes, have different desired values.

9. The method of moving an element through a predetermined desired path, which may include curved contours, while controlling the velocity along the path, comprising
(a) making a scale facsimile of the path,
(b) tracing the scale facsimile with a tracing instrument,
(c) registering in first and second counters the displacements ΔX and ΔY of said instrument along orthogonal X and Y axes,
(d) recording the numbers held in said counters and resetting said counters after said instrument has moved through each successive equal but selectable composite increment distance ΔD to create a numerical record of successive sets of ΔX and ΔY displacements, such record containing no information representing desired feed rate,
(e) measuring off successive equal time intervals T,
(f) reading successive sets of ΔX and ΔY displacements from said record and, during successive ones of said equal time intervals, generating successive groups of time sequenced X and Y command pulses, the quantity of command pulses in concurrent X and Y groups being proportional to the ΔX and ΔY displacements in a recorded set, and the command pulses in each group being uniformly time spaced within the corresponding time interval,
(g) moving said element along the orthogonal X and Y axes a predetermined increment in response to each X and Y command pulse, so that the element is moved (1) total distances along the X and Y axes according to the total number of X and Y axis command pulses, and (2) at velocities $V_x$ and $V_y$ along the X and Y axes which are proportional to the X and Y command pulse frequencies, and
(h) selecting the value of said increment distance ΔD to thereby determine the composite velocity $V_p$ of said element which results from the axis velocities $V_x$ and $V_y$.

10. The method defined in claim 1 further characterized in that there is an upper limit to the velocity at which said element can be safely moved along the X or Y axis, and including the step of lengthening those ones of said otherwise equal time intervals during which the ΔX or ΔY number tends to make the X or Y axis velocity exceed said limit, such lengthening being at least sufficient to obviate such tendency, whereby the path velocity of the element during such ones of the time intervals is not determined by the selected value of the tracing increment ΔD, but attempted excessive axis velocities are avoided without departure of the element from the desired path.

11. The method defined by claim 4 further characterized in that there is an upper limit to the velocity $V_x$ or $V_y$ at which said element can be moved along an X or Y axis, and including the step of lengthening those ones of said otherwise equal time intervals T whenever the recorded ΔX or ΔY displacement in a given set tends to make the velocity $V_x$ or $V_y$ exceed said limit, whereby the element is moved through the desired path without excessive axis velocity although the path velocity of said element is not directly determined by the selected product $v \cdot t$ during those ones of the time intervals which are lengthened.

12. The method defined by claim 8 further characterized in that there is an upper limit to the velocity at which said element can be safely moved along the X or Y axis, and wherein said X and Y command pulses in response to successive sets of recorded displacements are produced during equal time intervals measured off by the full cycle counting time of a counter of predetermined capacity receiving signals from a source of predetermined frequency, and including the step of reducing the frequency of said source whenever the frequency of either the X or Y command pulses tends to exceed a predetermined value corresponding to the said limit velocity.

13. The method of making a record of successive sets of numerical information for commanding an element to move through a desired path, comprising
(a) making a scale facsimile of the path,
(b) tracing the scale facsimile with a tracing instrument,
(c) measuring the displacements of the instrument along orthogonal X and Y axes each time that the instrument has moved through a selectable composite incremental distance ΔD along the path,
(d) recording as successive sets of two displacement numbers ΔX and ΔY the successive measured displacements, and
(e) selecting different values for the increments ΔD.

14. The method of making a record of successive blocks of multi-axis numerical information to be used in moving an element through an arbitrary desired path by linear interpolation, comprising
(a) making a scale facsimile of the path,
(b) tracing the scale facsimile with a tracing instrument moving at a known velocity along the facsimile path,
(c) counting the basic units of displacement of the instrument along orthogonal X and Y axes,
(d) recording on a digital record numbers representing the counts to represent ΔX and ΔY displacements of the instrument after each of a succession of equal but selectable time periods, and
(e) selecting different values for said time periods, whereby the digital record containing no velocity command information may thereafter be read into an interpolating director to effect movement of an element along the desired path with a composite path velocity determined by the previously selected time periods.

15. The method of making a record of successive sets of multi-axis numerical information to be used as command information for causing a movable element to move through an arbitrary desired path, comprising
   (a) making a scale facsimile of the path,
   (b) tracing the scale facsimile with a tracing instrument,
   (c) registering numerically in first and second counters the displacements of the instrument along X and Y axes as it follows the facsimile path,
   (d) transferring the numbers held in said counters to a digital numerical record, and resetting the counters, after the instrument has traveled through each of a succession of equal but selectable composite increment distances $\Delta D$, and
   (e) selecting different values of the increment distance $\Delta D$.

16. The method set forth in claim 15 and characterized in that said transferring step includes the sub-steps of
   (a) stopping the tracing instrument after it has traveled through each of said increment distances $\Delta D$,
   (b) reading out seriatim the successive integers of the multi-digit number contained in one of said counters and causing such integers to be represented in sequence on an elongated digital record,
   (c) reading out seriatim the successive integers of the multi-digit number contained in the other of such counters and causing such integers to be represented in a continuing sequence on the elongated digital record,
   (d) applying an end of block symbol next in sequence on said record,
   (e) resetting said counters, and
   (f) thereafter restarting the tracing motion of said instrument.

References Cited
UNITED STATES PATENTS

| | | | |
|---|---|---|---|
| 2,784,359 | 3/1957 | Kamm | 318—(20.110UX) |
| 2,833,941 | 5/1958 | Rosenberg et al. (A) | 318—39X |
| 2,927,735 | 3/1960 | Scuitto | 318—(20.110UX) |
| 2,996,348 | 8/1961 | Rosenberg (B) | 318—(20.102UX) |
| 3,072,833 | 1/1963 | Kerr et al. | 318—(20.102UX) |
| 3,079,522 | 2/1963 | McGarrell | 318—(20.108UX) |
| 3,286,085 | 11/1966 | Rado | 318—(20.110UX) |
| 2,784,359 | 3/1957 | Kamm | 318—(20.110) |
| 3,390,315 | 6/1968 | McDonough et al. | 318—(20.130X) |

THOMAS E. LYNCH, Primary Examiner

U.S. Cl. X.R.

33—18; 90—13; 235—151.11; 318—571, 578